US011195011B2

(12) United States Patent
Klaus

(10) Patent No.: US 11,195,011 B2
(45) Date of Patent: *Dec. 7, 2021

(54) OBJECT DETECTION AND AVOIDANCE FOR AERIAL VEHICLES

(71) Applicant: Amazon Technologies, Inc., Seattle, WA (US)

(72) Inventor: Andreas Klaus, Graz (AT)

(73) Assignee: Amazon Technologies, Inc., Seattle, WA (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/557,259

(22) Filed: Aug. 30, 2019

(65) Prior Publication Data

US 2020/0012842 A1 Jan. 9, 2020

Related U.S. Application Data

(63) Continuation of application No. 15/838,250, filed on Dec. 11, 2017, now Pat. No. 10,402,646.

(Continued)

(51) Int. Cl.
*G06K 9/00* (2006.01)
*H04N 13/239* (2018.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
USPC .......................................................... 701/5
See application file for complete search history.

(56) References Cited

U.S. PATENT DOCUMENTS 6,348,918 B1  2/2002 Szeliski et al.
10,049,589 B1  8/2018 Boyd et al.
(Continued)

FOREIGN PATENT DOCUMENTS

CN    102389361 A    3/2012
CN    102981616 A    3/2013
(Continued)

OTHER PUBLICATIONS

Search Report dated Dec. 31, 2020, for corresponding CN Application No. 201880061344.X, 2 pages.
(Continued)

*Primary Examiner* — Tyler D Paige
(74) *Attorney, Agent, or Firm* — Athorus, PLLC

(57) ABSTRACT

Aerial vehicles that are equipped with one or more imaging devices may detect obstacles that are small in size, or obstacles that feature colors or textures that are consistent with colors or textures of a landing area, using pairs of images captured by the imaging devices. Disparities between pixels corresponding to points of the landing area that appear within each of a pair of the images may be determined and used to generate a reconstruction of the landing area and a difference image. If either the reconstruction or the difference image indicates the presence of one or more obstacles, a landing operation at the landing area may be aborted or an alternate landing area for the aerial vehicle may be identified accordingly.

23 Claims, 16 Drawing Sheets

Related U.S. Application Data

(60) Provisional application No. 62/561,635, filed on Sep. 21, 2017.

(51) Int. Cl.

| | | |
|---|---|---|
| G06K 9/46 | (2006.01) | |
| G06Q 10/08 | (2012.01) | |
| G05D 1/04 | (2006.01) | |
| B64D 47/08 | (2006.01) | |
| G05D 1/00 | (2006.01) | |
| B64C 39/02 | (2006.01) | |
| G06K 9/62 | (2006.01) | |
| G06T 7/593 | (2017.01) | |
| G06T 7/579 | (2017.01) | |
| H04N 5/232 | (2006.01) | |
| H04N 5/247 | (2006.01) | |
| H04N 13/00 | (2018.01) | |

(52) U.S. Cl.
CPC .......... *G05D 1/0094* (2013.01); *G05D 1/042* (2013.01); *G06K 9/46* (2013.01); *G06K 9/6202* (2013.01); *G06Q 10/083* (2013.01); *G06T 7/579* (2017.01); *G06T 7/593* (2017.01); *H04N 5/23299* (2018.08); *H04N 13/239* (2018.05); *B64C 2201/128* (2013.01); *B64C 2201/141* (2013.01); *G06T 2207/10021* (2013.01); *G06T 2207/10032* (2013.01); *G06T 2207/30204* (2013.01); *G06T 2207/30261* (2013.01); *H04N 5/247* (2013.01); *H04N 2013/0081* (2013.01)

(56) References Cited

U.S. PATENT DOCUMENTS

| | | | |
|---|---|---|---|
| 10,088,736 | B2 | 10/2018 | Harris et al. |
| 10,395,544 | B1* | 8/2019 | Harris .................. G08G 5/0069 |
| 10,402,646 | B2* | 9/2019 | Klaus .................. G06K 9/6202 |
| 2004/0109585 | A1 | 6/2004 | Tao et al. |
| 2010/0305857 | A1* | 12/2010 | Byrne ....................... G06T 7/73 |
| | | | 701/301 |
| 2012/0148097 | A1 | 6/2012 | Park et al. |
| 2014/0064624 | A1 | 3/2014 | Kim et al. |
| 2014/0212027 | A1 | 7/2014 | Hallquist et al. |
| 2015/0062117 | A1 | 3/2015 | Reitmayr |
| 2015/0248584 | A1* | 9/2015 | Greveson ............. G06K 9/4671 |
| | | | 382/113 |
| 2016/0104384 | A1 | 4/2016 | Hanel et al. |
| 2016/0122038 | A1* | 5/2016 | Fleischman .......... G05D 1/0676 |
| | | | 701/2 |
| 2017/0090271 | A1 | 3/2017 | Harris et al. |
| 2018/0357909 | A1* | 12/2018 | Eyhorn ................ G08G 5/0013 |
| 2019/0087635 | A1* | 3/2019 | Klaus ...................... G06T 7/593 |
| 2019/0163206 | A1* | 5/2019 | Zhu ......................... G06T 7/593 |
| 2020/0012842 | A1* | 1/2020 | Klaus ................... B64C 39/024 |

FOREIGN PATENT DOCUMENTS

| | | |
|---|---|---|
| CN | 103522970 A | 1/2014 |
| EP | 2919093 A1 | 9/2015 |
| WO | 2017053627 A1 | 3/2017 |

OTHER PUBLICATIONS

Amintabar, Amirhasan et al., "Homography-based plane identification and matching", 15th IEEE International Conference of Image Processing: ICIP 2008; San Diego, California USA, Oct. 12-15, 2008, IEEE, Piscataway, NJ, USA, Oct. 12, 2008 (Oct. 12, 2008), pp. 297-300.

International Search Report for International Application No. PCT/US2018/051750, dated Dec. 20, 2018.

International Search Report for PCT Application No. PCT/US2016/053198 dated Dec. 15, 2016.

Meng Cai et al: "Homography-based depth recovery with descent images", A Machine Vision and Applications, Springer Verlag, DE, vol. 24, No. 5, Apr. 5, 2013 (Apr. 5, 2013), pp. 1093-1106, [retrieved on Apr. 5, 2013].

Miguel A. Olivares-Mendez et al: "Autonomous Landing of an Unmanned Aerial Vehicle using Image-Based Fuzzy Control", Proceedings of the 17th World Congress the International Federation of Automatic Control; Seoul, Korea; Jul. 6-11, 2008, vol. 46, No. 30, Jan. 1, 2013 (Jan. 1, 2013), pp. 79-86.

Tan Ho et al.: "Object Removal in Multi-view Images using Disparity Layering and Piecewise Homography", Proceedings of the International Conference on Electrical and Computer Systems Ottawa, Aug. 24, 2012 (Aug. 24, 2012), pp. 22-24.

Chao, H. et al., A Survey of Optical Flow Techniques for UAV Navigation Applications, 2013 International Conference on Unmanned Aircraft Systems (ICUAS), May 28-31, 2013, Grand Hyatt Atlanta, Atlanta, GA, pp. 710-716.

Choi, J.H. et al., Tracking an Unknown Moving Target from UAV: Extracting and Localizing a Moving Target with Vision Sensor Based on Optical Flow, The 5th International Conference on Automation, Robotics and Applications, Dec. 6-8, 2011, Wellington, New Zealand, pp. 384-389.

\* cited by examiner

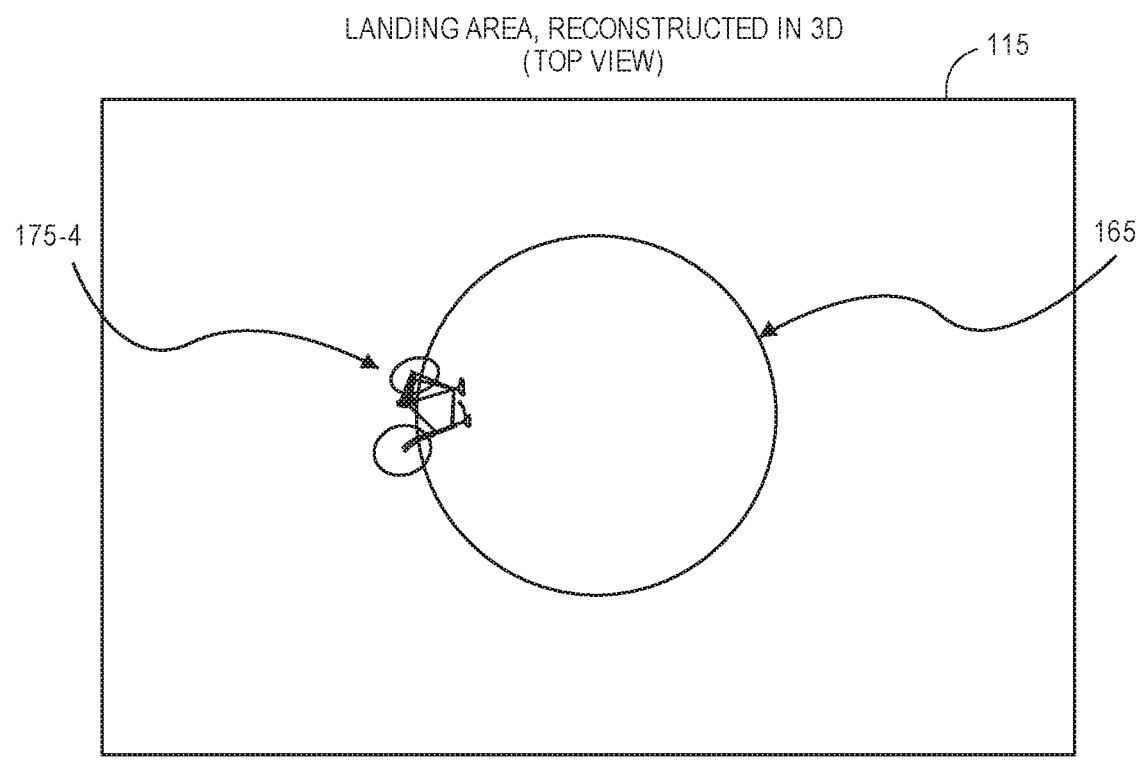
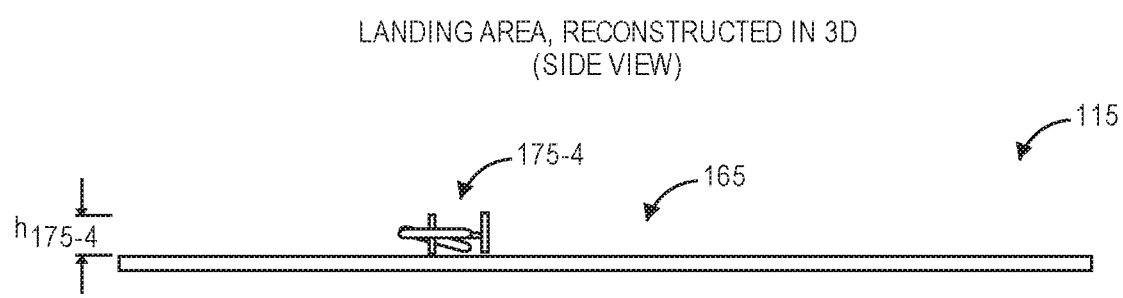
FIG. 1G

OBJECT DETECTION AND AVOIDANCE FOR AERIAL VEHICLES

CROSS-REFERENCE TO RELATED APPLICATIONS

This application is a continuation of U.S. patent application Ser. No. 15/838,250, filed Dec. 11, 2017, the contents of which are hereby incorporated by reference herein in their entirety. This application further claims the benefit of priority to U.S. Patent Application No. 62/561,635, filed Sep. 21, 2017, the contents of which are hereby incorporated by reference herein in their entirety.

BACKGROUND

Unmanned aerial vehicles (or "UAV") are modern, versatile machines that are currently being used in an increasing number of monitoring, surveillance and delivery operations. An unmanned aerial vehicle may be configured to operate in two or more flight modes, including a forward flight mode (or a substantially horizontal flight mode) in which the aerial vehicle travels from one point in space (e.g., a land-based point or, alternatively, a sea-based or air-based point) to another point in space by traveling over at least a portion of the surface of the Earth. An unmanned aerial vehicle may also be configured to engage in a vertical flight mode in which the aerial vehicle travels in a vertical or substantially vertical direction from one altitude to another altitude (e.g., upward or downward, from a first point on land, on sea or in the air to a second point in the air, or vice versa) substantially normal to the surface of the Earth, or hovers (e.g., maintains a substantially constant altitude), with an insubstantial change in horizontal or lateral position over the surface of the Earth. An unmanned aerial vehicle may be further configured to operate in both forward and vertical flight modes, e.g., in a hybrid mode in which a position of the unmanned aerial vehicle changes in both horizontal and vertical directions. Forces of lift and thrust are commonly applied to unmanned aerial vehicles using one or more propellers, or devices having blades that are mounted about a hub and joined to a shaft or other component of a prime mover, which may rotate at angular velocities of thousands of revolutions per minute during flight operations.

Unmanned aerial vehicles are frequently equipped with one or more imaging devices such as digital cameras which may be used to aid in the guided or autonomous operation of an aerial vehicle, to determine when the aerial vehicle has arrived at or passed over a given location, or is within range of one or more structures, features, objects or humans (or other animals), to conduct surveillance or monitoring operations, or for any other purpose.

When transitioning from a horizontal flight mode to a vertical flight mode and preparing to land, e.g., to deliver or retrieve a payload, or for any other reason, an unmanned aerial vehicle must determine whether a designated landing area for the unmanned aerial vehicle is free of obstacles. If a landing area includes one or more obstacles, such as humans, animals, structures or debris, an unmanned aerial vehicle that attempts to land at the landing area risks causing injury to one or more humans or other animals, or damage to one or more structures, as well as the unmanned aerial vehicle itself. Where a landing area includes one or more obstacles that are sufficiently large, or that include surfaces having one or more colors or textures that are distinct from colors or textures of surfaces of the landing area, such obstacles may be readily identified in visual imaging data captured by the unmanned aerial vehicle. Where a landing area includes one or more obstacles that have small spatial extents, or that feature surfaces having colors or textures that are similar to or consistent with colors or textures of surfaces of the landing area, however, such obstacles may not be readily identified in one or more visual imaging data captured thereby, yet may pose substantial hazards to the safe operation and the integrity of the unmanned aerial vehicle.

BRIEF DESCRIPTION OF THE DRAWINGS

FIGS. 1A through 1I are views of aspects of one system for object detection and avoidance in accordance with embodiments of the present disclosure.

DETAILED DESCRIPTION

As is set forth in greater detail below, the present disclosure is directed to unmanned aerial vehicles that are configured to autonomously detect and avoid obstacles (or obstructions) that are located in or around landing areas for such vehicles. More specifically, one or more of the systems and methods disclosed herein are directed to capturing two or more images of a landing area using one or more images that are provided aboard an aerial vehicle, and analyzing such images to determine whether the landing area is free of obstacles, or whether an attempted landing operation at the landing area should be modified or aborted. The images may be processed to determine disparities between corresponding regions of pixels within the images. In some embodiments, the pixel disparities may be determined according to an optical flow algorithm, a matching algorithm, or by any other technique. In some embodiments, the pixel disparities may be determined by a coarse-to-fine refinement technique, in which the images are downsampled and initially processed at a low resolution to determine disparities between corresponding sets of pixels. The images are then upsampled in layers, and processed at progressively higher levels of resolution, with the pixel disparities being revised until the images are at their original, maximum levels of resolution.

The pixel disparities determined from images captured by the aerial vehicle may be used for multiple purposes, including to generate a three-dimensional reconstruction of the landing area, as well as to calculate difference images based on the respective images. In accordance with some embodiments of the present disclosure, a landing area may be determined to be free and clear of obstacles (or obstructions) if the three-dimensional reconstruction indicates that the landing area is flat and smooth, and if the difference image is determined to be inconspicuous across the landing area. If the three-dimensional reconstruction indicates that the landing area is not flat or smooth, or if the difference image indicates that one or more obstacles (or obstructions) is present at the landing area, then an aerial vehicle may abort a landing operation, attempt to perform the landing operation at an alternate landing area, search for an alternate landing area based on images captured thereby, or take any other relevant action accordingly.

Figure 1A:
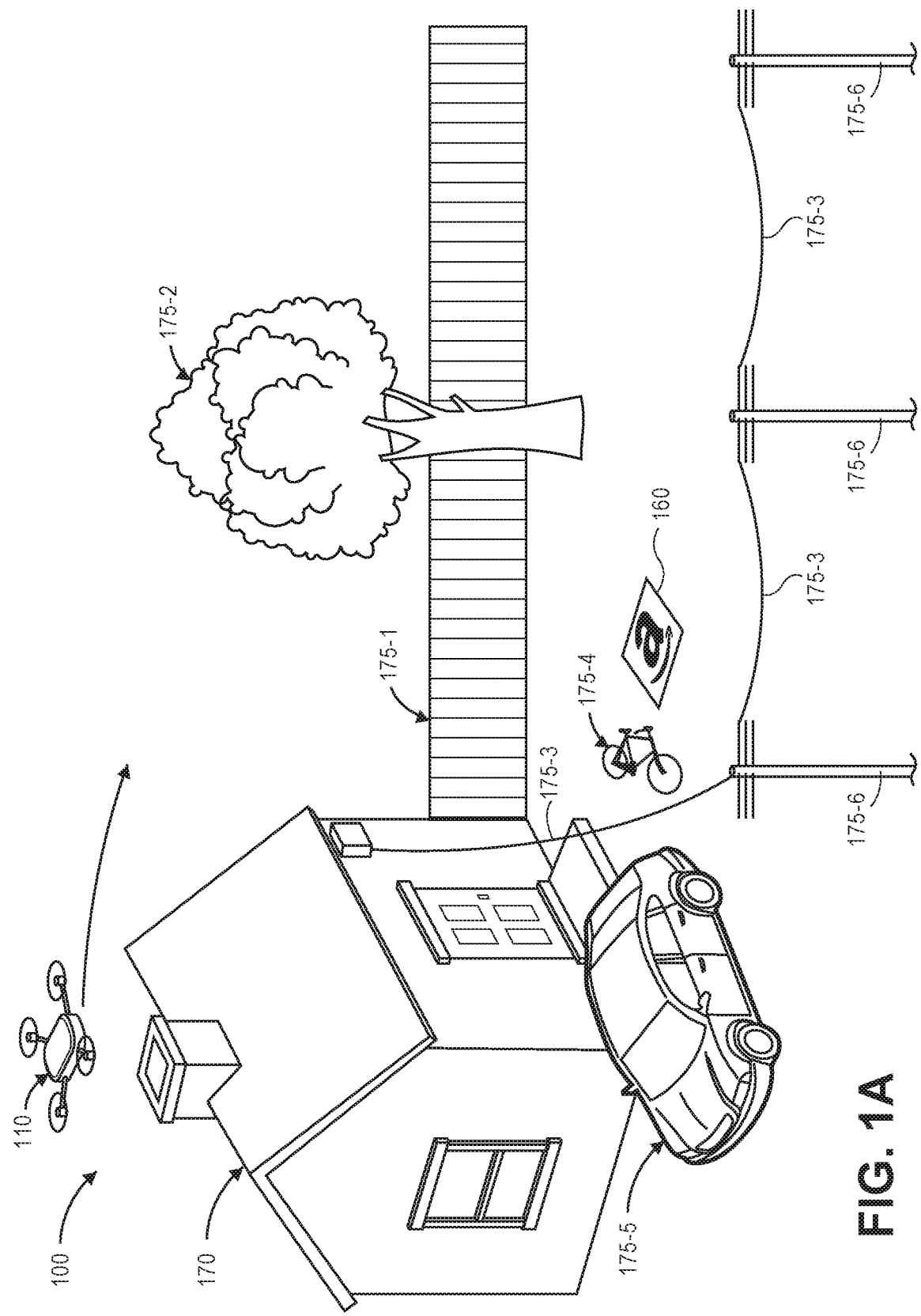
Figure 1B:
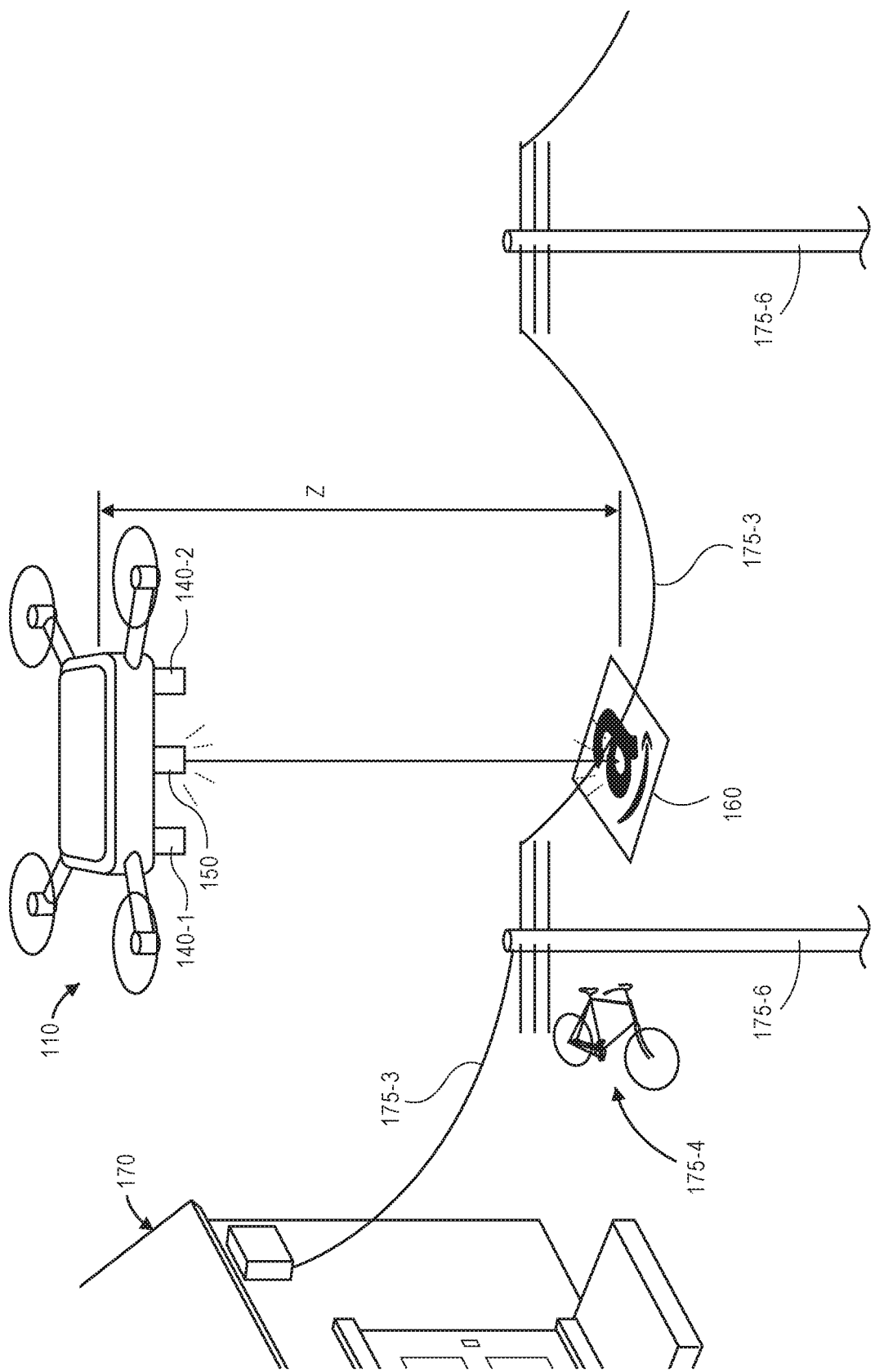

Referring to FIGS. 1A through 1I, a system 100 for object detection and avoidance in accordance with embodiments of the present disclosure is shown. As is shown in FIGS. 1A and 1B, the system 100 includes an aerial vehicle 110 approaching a destination 170 (e.g., a house or other dwelling, an office building, or any other facility that may receive deliveries of items) that bears a target marker 160 on a landing surface. A plurality of obstacles (or obstructions) 175-1, 175-2, 175-3, 175-4, 175-5, 175-6 are present within a vicinity of the target marker 160, including a fence (or wall) 175-1, a tree (or other natural plant) 175-2, one or more utility wires 175-3, a bicycle 175-4 (or other object), an automobile 175-5, and a plurality of utility poles 175-6. The obstacles 175-1, 175-2, 175-3, 175-4, 175-5, 175-6 may be static or dynamic in nature, e.g., fixed in their respective positions or mobile.

The aerial vehicle 110 may be any manned or unmanned aerial vehicle configured to operate in forward flight and/or vertical flight modes, or a hovering mode. The aerial vehicle 110 of FIGS. 1A and 1B includes a pair of imaging devices (e.g., digital cameras) 140-1, 140-2 and a range finder 150. The imaging devices 140-1, 140-2 are aligned in a vertically downward orientation, or in a substantially vertically downward orientation, with respect to one or more principal axes of the aerial vehicle and configured to capture imaging data regarding one or more surfaces or other objects that are located beneath the aerial vehicle 110. The range finder 150 may be any device, e.g., an altimeter, a laser range finder, another imaging device, a radar system, a sonic system, a Global Positioning System (or "GPS") transceiver, or any other component for determining an altitude of the aerial vehicle 110, or a distance to one or more surfaces or other objects that are located beneath the aerial vehicle 110.

As is shown in FIG. 1B, the aerial vehicle 110 may begin to search for obstacles at the landing area when the aerial vehicle 110 reaches a predetermined altitude threshold. For example, as is shown in FIG. 1B, the aerial vehicle 110 may determine that it has reached an altitude z using the range sensor 150 or any other device, and may compare the altitude z to a threshold that may be defined on any basis, including one or more attributes of the destination 170 or a mission of the aerial vehicle 110, any operational considerations of the aerial vehicle 110, or any other basis (e.g., prevailing weather conditions near the destination 170). Upon confirming that the altitude z of the aerial vehicle 110 is within the predetermined altitude threshold, the aerial vehicle 110 may begin to search for the target marker 160 and evaluate the landing area at the destination 170.

As is shown in FIGS. 1A and 1B, the aerial vehicle 110 may locate and recognize the target marker 160 using any systems, methods or techniques. For example, the aerial vehicle 110 may capture one or more images of surfaces within a vicinity of the destination 170, and recognize one or more edges, contours, outlines, colors, textures, silhouettes, shapes or other characteristics of the target marker 160 within one or more of such images. In some embodiments, the target marker 160 may take the form of a mat, a tarp, a sheet or any other covering that may be laid upon a surface, e.g., by one or more personnel or machines at the destination 170, where a landing of the aerial vehicle 110 is desired. The target marker 160 may be formed from any material that is flexible and sufficiently durable, including but not limited to natural or synthetic fibers (e.g., woven or non-woven fibers) or other substrates, in order to provide an interface between the target marker 160 and a surface at the destination 170 upon which the target marker 160 is applied. In some other embodiments, the target marker 160 may be formed from paint, ink, chalk or any other materials. The target marker 160 may further include one or more alphanumeric characters, symbols, bar codes (e.g., one-dimensional or two-dimensional bar codes, such as "QR" codes) or other markings or indicia that may be recognized by one or more sensors aboard the aerial vehicle 110, including but not limited to either or both of the imaging devices 140-1, 140-2. In still other embodiments, the target marker 160 may be a natural or previously existing object or artifact at the destination 170, e.g., a parking space or an identifier thereof; a utility structure such as a manhole cover, a water main valve cover, or the like.

In some embodiments, the target marker 160 may be recognized based on analyses of images captured by either or both of the imaging devices 140-1, 140-2 alone. In some embodiments, the target marker 160 may be outfitted with one or more systems or components that are configured to transmit one or more signals to the aerial vehicle 110 or receive one or more signals from the aerial vehicle 110, which may then detect and/or recognize the target marker 160 based on one or more of such signals. For example, the target marker 160 may be equipped with one or more infrared emitters or receivers, acoustic emitters or receivers, Wi-Fi-enabled devices, Bluetooth®-enabled devices, RFID-enabled devices or the like. Signals transmitted and/or received by the target marker 160 may be used by the aerial vehicle 110 to determine the position of the target marker 160 or, alternatively, the altitude z of the aerial vehicle 110. In some embodiments, the target marker 160 may be recognized based on analyses of images captured by either or both of the imaging devices 140-1, 140-2, along with one or more signals transmitted by the target marker 160 to the aerial vehicle 110, or received by the target marker 160 from the aerial vehicle 110.

Figure 1C:
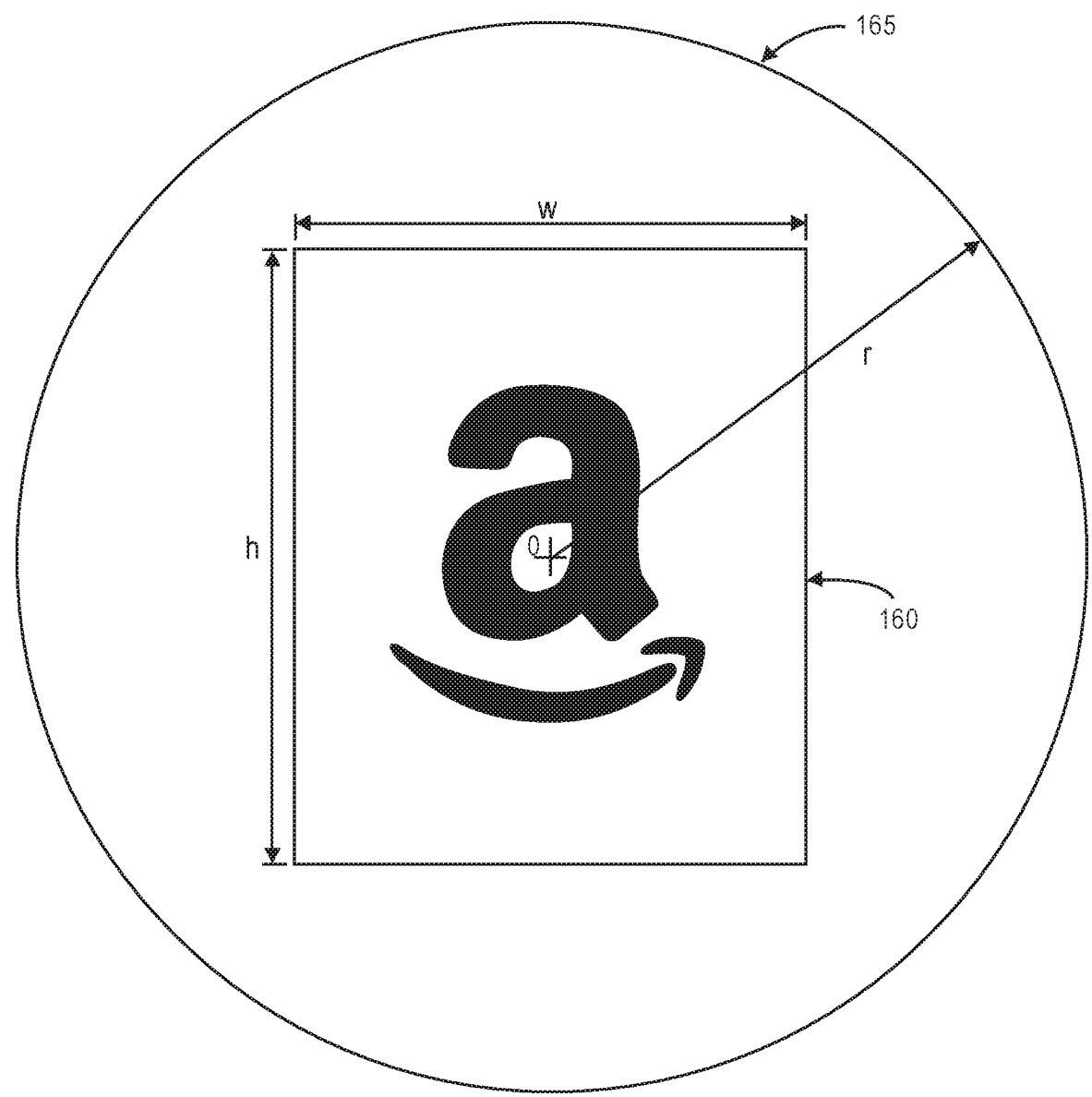

The aerial vehicle 110 may define a landing area 165 upon detecting the target marker 160 at the destination 170. For example, as is shown in FIG. 1C, a center O of the target marker 160 may be determined from one or more images captured by the imaging devices 140-1, 140-2, e.g., based on one or more attributes of the imaging devices 140-1, 140-2 (e.g., focal lengths), the altitude z, or one or more dimensions of the target marker 160, or on any other factor. Once the center O has been determined, the landing area 165 may be defined as a circle having a predetermined radius r from the center O. The predetermined radius r may be determined based on one or more attributes of the aerial vehicle 110, e.g., a maximum width or other dimension of the aerial vehicle 110, plus one or more margins for safety and/or accuracy, or one or more attributes of the aerial vehicle 110 or a mission being performed thereby. The predetermined radius r may have any value. In some embodiments, the predetermined radius r may be approximately three meters (3 m). In some other embodiments, the landing area 165 may have any shape other than that of a circle, such as a square, a rectangle, a triangle or any polygon or other shape. The landing area 165 may be assumed to be perfectly flat, and at an acceptable slope.

Alternatively, in some embodiments, the landing area 165 may be defined in any manner, and based on any identified position. For example, the aerial vehicle 110 may be configured to travel to a specific point and may, upon determining that it has arrived at the specific point based on one or more GPS signals or in any other manner, define the landing area 165 based on that specific point. For example, the aerial vehicle 110 may define the landing area 165 as a circle having a predetermined radius from that specific point, or as any other shape (e.g., a square, a rectangle, a triangle or any polygon or other shape) with respect to that specific point.

Figure 1D:
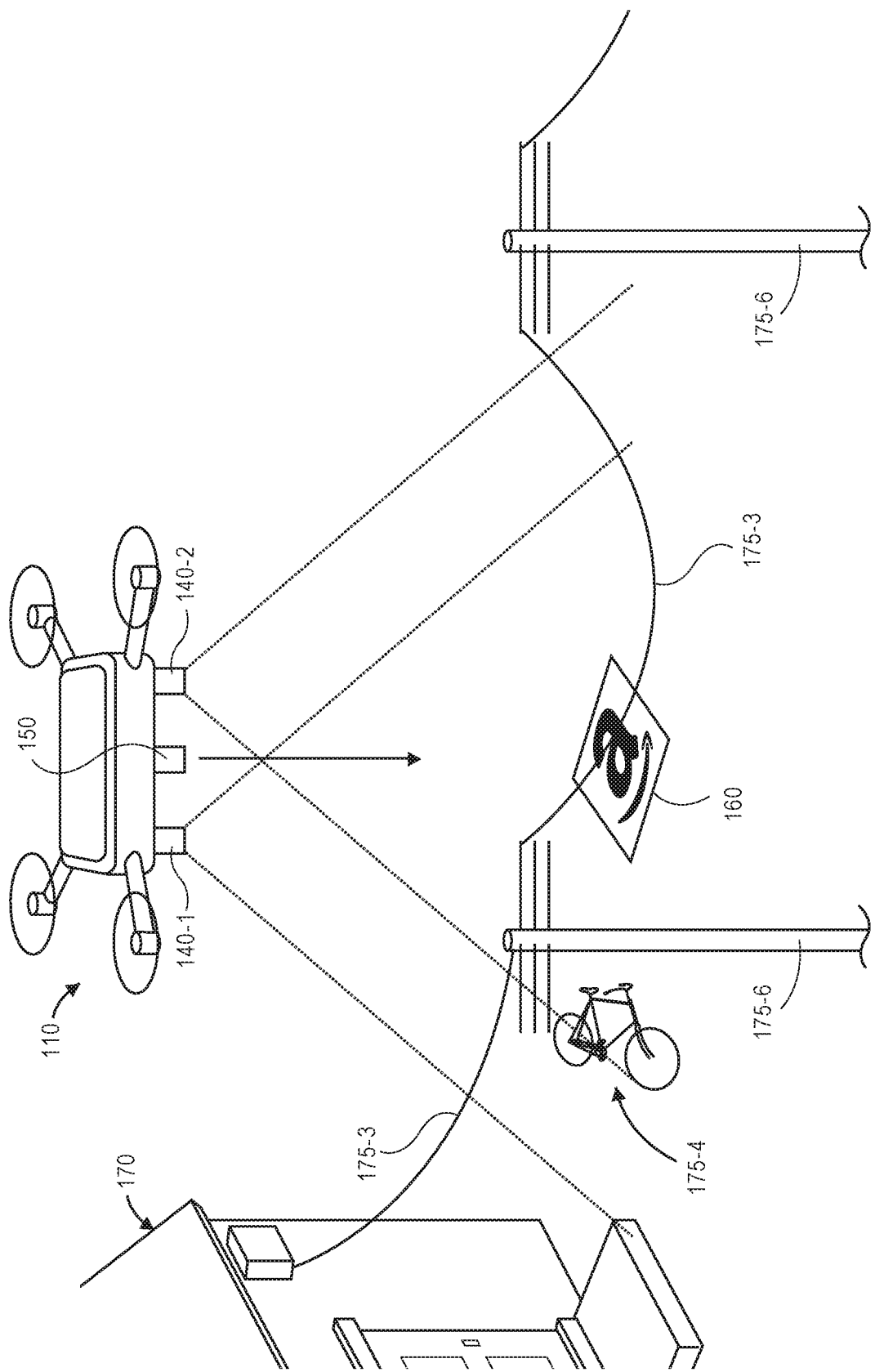

As is shown in FIG. 1D, after the target marker 160 has been detected and the landing area 165 has been defined, or after the landing area 165 has been defined on any other basis, the aerial vehicle 110 may capture a plurality of images as the aerial vehicle 110 descends to the landing area 165. The imaging devices 140-1, 140-2 may be aligned with fields of view that include the target marker 160 and the landing area 165, and overlap at least in part, and may be configured to capture images at any frame rate, e.g., ten frames per second. Alternatively, the aerial vehicle 110 may feature a single imaging device aligned with a field of view that includes the landing area 165, and is configured to capture images at any frame rate, e.g., ten frames per second, as the aerial vehicle 110 descends to the landing area 165. In some embodiments, where the aerial vehicle 110 includes a single imaging device, the aerial vehicle 110 may make one or more lateral variations in position as the aerial vehicle 110 descends to the landing area 165.

Figure 1E:
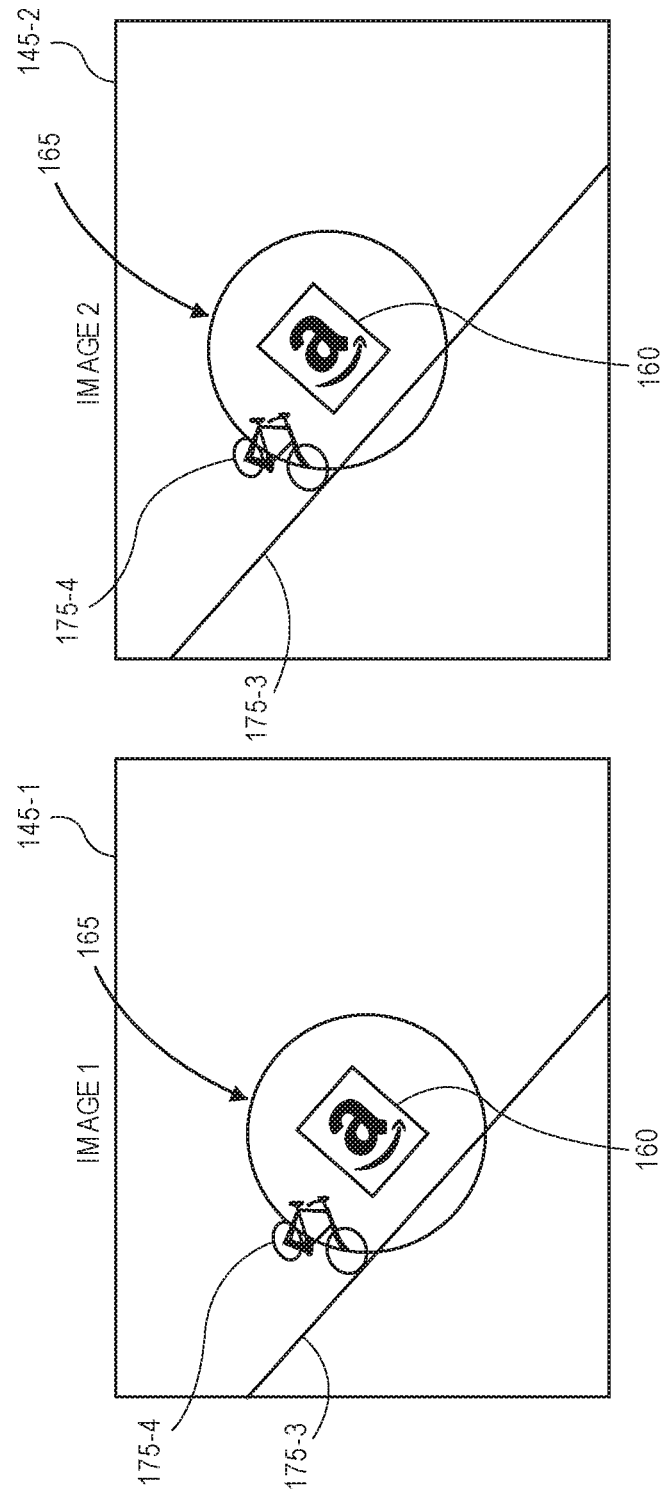

Pairs of images captured by the imaging devices 140-1, 140-2 may be processed to determine any disparities between corresponding pixels that appear within each of the images. As is shown in FIG. 1E, an image 145-1 captured by the imaging device 140-1 and an image 145-2 captured by the imaging device 140-2 each include the target marker 160, the landing area 165 and portions of the obstacles 175-3, 175-4. For example, as is shown in the images 145-1, 145-2, one or more of the utility wires 175-3 pass over a portion of the landing area 165, and the bicycle 175-4 lies at a perimeter of the landing area 165.

The images 145-1, 145-2 may be processed to determine disparities between corresponding pixels that appear within each of the images 145-1, 145-2. In some embodiments, an optical flow algorithm that receives the images 145-1, 145-2 as inputs and determines horizontal and/or vertical disparities between pixels appearing within each of the images as outputs of the optical flow algorithm. Such outputs may include a disparity image indicating disparities between points appearing within each of the images 145-1, 145-2 or, alternatively, a displacement image indicating horizontal displacements (e.g., horizontal disparities) between points appearing within each of the images 145-1, 145-2 and/or a parallax image indicating vertical parallax (e.g., vertical disparities) between points appearing within each of the images 145-1, 145-2.

In other embodiments, the images 145-1, 145-2 may be processed according to a stereo matching algorithm. In such embodiments, the imaging devices 140-1, 140-2 are preferably calibrated, and the images 145-1, 145-2 are preferably pre-processed according to one or more rectification processes, e.g., to place the images 145-1, 145-2 in a common plane, to eliminate any vertical parallax between corresponding pixels appearing within each of the images 145-1, 145-2. As a result, an output of the stereo matching algorithm depicts merely displacements (e.g., horizontal disparities), between the corresponding pixels appearing within each of the images 145-1, 145-2.

In some embodiments, the processing of images 145-1, 145-2 to determine the correspondences between points appearing in each of the respective images 145-1, 145-2 may be performed first at a coarse level, e.g., on downsampled versions of the images 145-1, 145-2, at a low level of resolution, and next on progressively upsampled versions of the images 145-1, 145-2, at gradient descent update steps on each of a plurality of increasingly higher levels of resolution, until correspondences of pixels are determined based on each of the images 145-1, 145-2 in their original, highest levels of resolution. In some embodiments, after a first processing at a coarse level of resolution, each of the images 145-1, 145-2 may be progressively upsampled, e.g., by a factor of two or by another factor, until the images 145-1, 145-2 are processed at their original, highest levels of resolution.

Figure 1F:
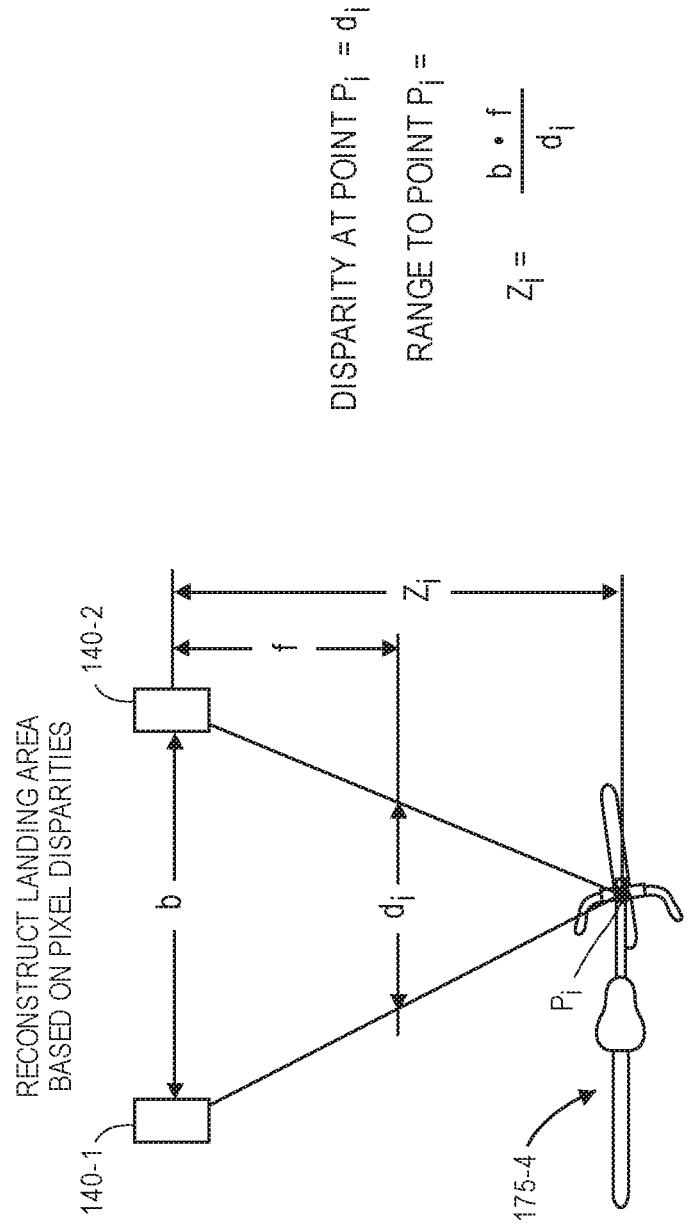

Once disparities between pixels corresponding to points appearing within each of the images 145-1, 145-2 have been determined, e.g., by an optical flow algorithm, or a matching algorithm, the disparities may be used to construct (or reconstruct) the landing area 165 in three dimensions. For example. as is shown in FIG. 1F, each of the points $P_i$ appearing within both of the images 145-1, 145-2 may be constructed based on not only their respective disparities $d_i$, but also a baseline distance b between the imaging devices 140-1, 140-2 when the images 145-1, 145-2 were captured. A distance $z_i$ between the aerial vehicle 110 and each of such points $P_i$ may be determined accordingly. Using such distances $z_i$, determined for a plurality of points appearing within both of the images 145-1, 145-2, a three-dimensional surface map of the landing area 165 and its surroundings may be constructed. As is shown in FIG. 1G, a top view and a side view of a surface map 115 of the landing area 165 are shown. The surface map 115 indicates disparity errors within planes of the images 145-1, 145-2. The surface map 115 may then be compared to the landing area 165, which is presumed to be flat and free of obstructions. Portions of the surface map 115 that do not include any disparity errors correspond to portions of the landing area 165 that are flat and free of obstructions. Any discontinuities identified in the surface map 115 may be indicative of one or more obstructions at the landing area 165, however. For example, as is shown in FIG. 1G, the surface map 115 indicates the presence of an obstacle, viz., a height $h_{175-4}$ of the bicycle 175-4, in the landing area 165 based on disparities identified between the images 145-1, 145-2 according to an optical flow algorithm, a stereo matching algorithm, or on any other basis.

Figure 1H:
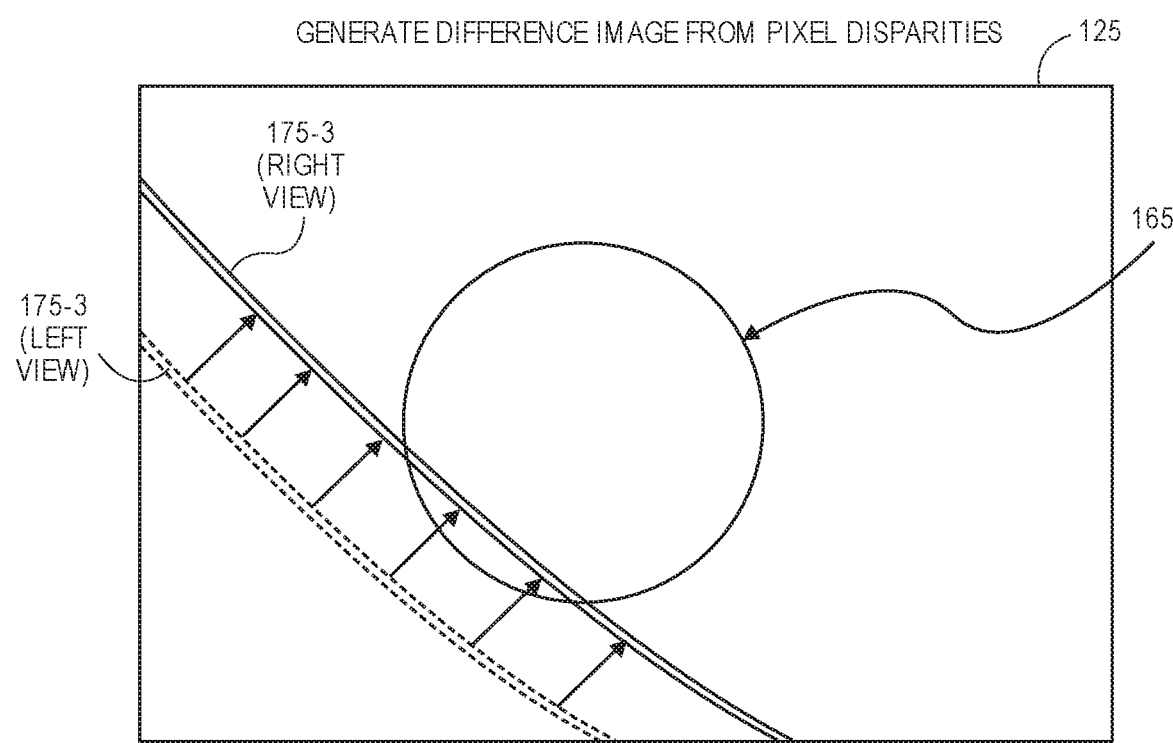

Additionally, disparities between the pixels appearing within the images 145-1, 145-2 may also be used to calculate a difference image 125. The difference image 125 may be calculated by subtracting absolute intensities of the images 145-1, 145-2, or by deriving intensity gradients for the images 145-1, 145-2 and comparing the intensity gradients to one another. For example, as is shown in FIG. 1H, after the pixel disparities have been determined, an input image (e.g., one of the image 145-1 or the image 145-2) may be warped upon an output image (e.g., another of the image 145-1 or the image 145-2), resulting in the difference image 125, which shows a difference in the appearance of the utility wire 175-3 from a left view and from a right view. Alternatively, each of the images 145-1, 145-2 may be respectively warped to a new (e.g., third) coordinate frame. The difference image 125 may be used to detect obstacles having small spatial extents that may not appear within a reconstruction of the landing area 165, such as the surface map 115 of FIG. 1G. Optionally, prior to calculating the difference image 125, either or both of the images 145-1, 145-2 may be processed to compensate for variations in brightness or other visual effects within the respective images 145-1, 145-2. In some embodiments, a score may be calculated based on one or more aspects of the difference image 125, e.g., based on one or more pixels of the difference image 125, or differences in intensity values between pixels of one of the images 145-1, 145-2 and pixels of another of the images 145-1, 145-2. For example, a score indicative of a peak difference, a mean difference, a median difference, or any other measure or metric associated with the differences between such pixels may be calculated, and the landing area 165 may be determined to have one or more obstacles or obstructions where the score exceeds a predetermined threshold. Any type or form of score representative of qualities of the difference image 125 may be calculated and compared to one or more thresholds in accordance with the present disclosure.

Figure 1I:
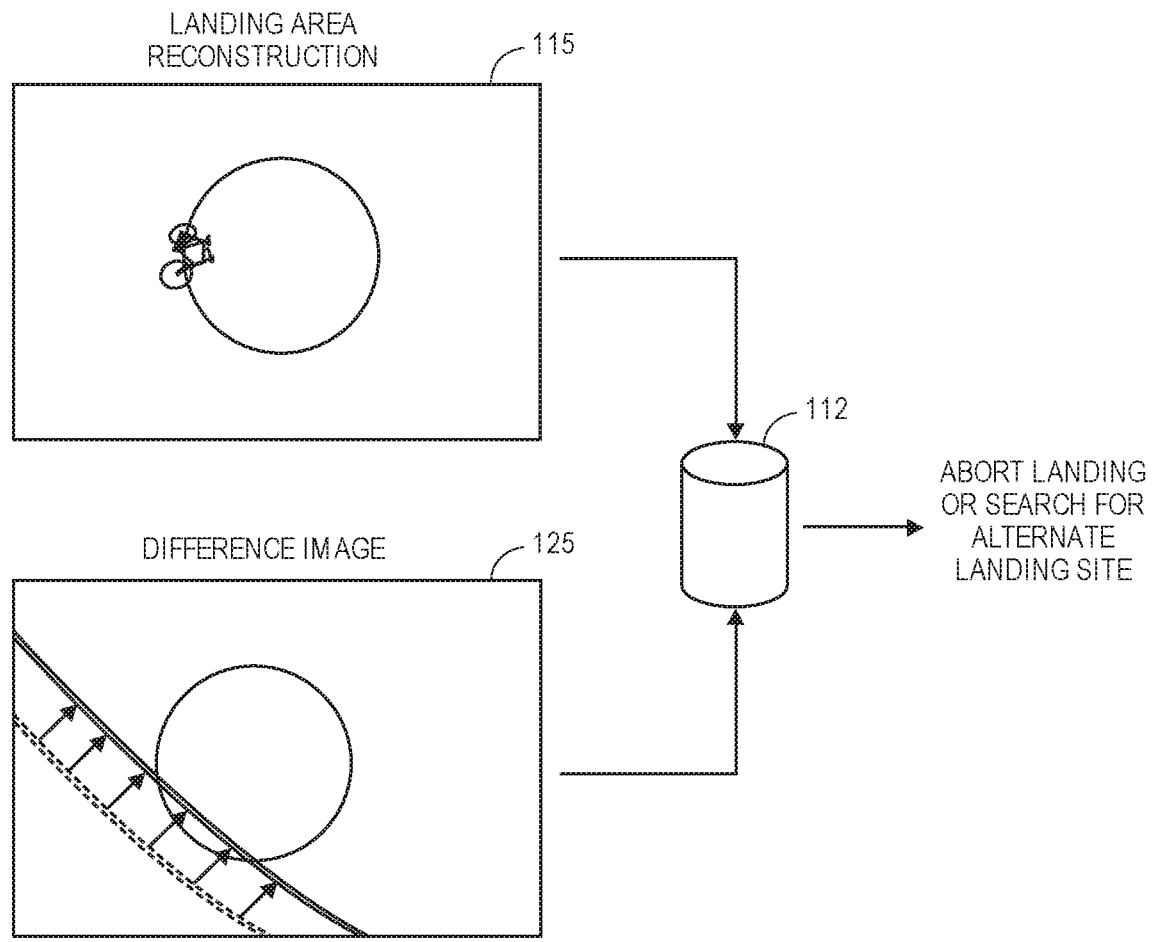

As is shown in FIG. 1I, after the surface map 115 and the difference image 125 have been derived from the images 145-1, 145-2, one or more processors 112 operating aboard the aerial vehicle 110 may determine whether the landing area 165 is free from obstructions, and may abort the landing, or search for an alternate landing site. For example, where the surface map 115 indicates the presence of the bicycle 175-4 at the landing area 165, or the difference image 125 indicates the presence of the utility wires 175-3 above the landing area 165, the aerial vehicle 110 may determine that the landing area 165 is not free of obstructions. As a result, the aerial vehicle 110 may return to its origin or an alternate location, or may attempt to locate a backup landing area (e.g., one or more landing areas that may be designated by a customer or other person associated with the destination 170) or search for an alternate landing area, within a vicinity of the destination 170.

Thus, the systems and methods of the present disclosure are directed to detecting and avoiding objects during a landing operation of an unmanned aerial vehicle, or any other operation of the unmanned aerial vehicle, based on two or more images captured by the unmanned aerial vehicle. The images may be captured at the same time by different imaging devices, such as the imaging devices 140-1, 140-2 of the aerial vehicle 110 of FIG. 1A through 1I, or at different times by a single imaging device. The images may be processed to determine disparities between pixels of the respective images, e.g., using an optical flow algorithm, a matching algorithm or another technique. Such disparities may be used to generate a three-dimensional reconstruction of an operating area (e.g., a landing area) for the aerial vehicle, or to calculate a difference image of the operating area. Where either the reconstruction or the difference image indicates the presence of an obstacle, the aerial vehicle may permanently or temporarily suspend the operation, search for another operating area to complete the operation, or continue to evaluate the status of the operating area for a period of time.

Accordingly, the systems and methods of the present disclosure are directed to determining whether one or more objects is located in, around or above a landing area based on pairs of images captured by an aerial vehicle. The images of such pairs may be captured simultaneously or nearly simultaneously by two imaging devices or, alternatively, at different times by a single imaging device. Disparities between points appearing in each of the images may be determined, and used to both reconstruct the landing area in three dimensions and also to generate a difference image from the images. The reconstruction of the landing area and the difference image may indicate the presence of one or more obstructions in, around or above the landing area. For example, the reconstruction may indicate the presence of one or more objects in, around or above a landing area, which is presumed to be flat, and acceptably sloped, even if such objects have colors or textures that are similar to colors or textures of surfaces of the landing area. The difference image may indicate the presence of one or more objects in, around or above a landing area, even where such objects have a comparatively small spatial extent.

Imaging data (e.g., visual imaging data) may be captured using one or more imaging devices such as digital cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, e.g., digital images, and store such data files in one or more onboard or accessible data stores (e.g., a hard drive or other like component), as well as one or more removable data stores (e.g., flash memory devices), or displayed on one or more broadcast or closed-circuit television networks, or over a computer network such as the Internet.

A digital image is a collection of pixels, typically arranged in an array, which defines an optically formed reproduction of one or more objects, backgrounds or other features of a scene and may be stored in a data file. In a visual image, each of the pixels represents or identifies a color or other light condition associated with a portion of such objects, backgrounds or features. For example, a black-and-white visual image includes a single bit for representing a light condition of the pixel in a binary fashion (e.g., either black or white), while a grayscale visual image may represent the light condition in multiple bits (e.g., two to eight bits for defining tones of gray in terms of percentages or shares of black-and-white), and a color visual image may include groups of bits corresponding to each of a plurality of base colors (e.g., red, green or blue), and the groups of bits may collectively represent a color associated with the pixel. A depth image is also a collection of pixels that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in a distance between the sensor and the lens (e.g., optical zoom lenses or digital zoom lenses), a change in a location of the imaging device, or a change in one or more of the angles defining an angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #31314A. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Stereo ranging (or stereo triangulation) is a process by which distances or ranges to objects may be determined from digital images depicting such objects that are captured using imaging devices, such as digital cameras, that are separated by a fixed distance, or from images depicting such objects that are captured using an imaging device, such as a digital camera, at different times. For example, by processing pairs of images of an environment that are captured by imaging devices, ranges to points expressed in both of the images (including but not limited to points associated with specific objects) may be determined by finding a virtual intersection of pairs of lines extending from the respective lenses or sensors of the imaging devices through representations of such points within each of the images. Alternatively, ranges to points expressed in a pair of images of an environment that are captured by an imaging device at different times may be determined by finding a virtual intersection of pairs of lines extending from a position of a lens or sensor of the imaging device at times when each of the images was captured through representations of such points within each of the images.

If each of the images of the environment is captured substantially simultaneously, or if conditions of the environment are substantially unchanged when each of the images is captured, a range to a single point within the environment at a given time may be determined based on a baseline distance between positions of the lenses or sensors of the one or more imaging devices that captured such images and a disparity, or a distance between corresponding representations of a single point in space expressed within both of the images when the images are superimposed upon one another. Such processes may be completed for any number of points in three-dimensional space that are expressed in both of the images, and a model of such points, e.g., a point cloud, a depth map or a depth model, may be defined accordingly. The model of such points may be updated as pairs of images are subsequently captured and processed to determine ranges to such points.

Distances (or depths or ranges) to objects that are represented in a pair of stereo images captured by imaging devices (e.g., digital cameras) having fields of view that overlap, at least partially may be determined according to one or more stereo ranging algorithms or techniques. For each point of each object that appears in both of the images, lines extending from the respective lenses, lens modules or other sensors of the respective imaging devices through representations of the points of the objects in each of the images will virtually intersect at a location corresponding to the actual position of that point, in three-dimensional space. Through the use of traditional geometric principles and properties, e.g., the properties of similar triangles, as well as known or knowable variables such as baseline distance or separation between the imaging devices, the disparity between the points within the respective images and the focal lengths of the respective imaging devices, coordinates of the intersecting point may be determined accordingly.

Where a point in space appears in two images, e.g., as epipoles, a plane defined by the positions of the respective epipoles within the images and an actual position of the point in space is called an epipolar plane. The images may then be co-aligned based on their contents, e.g., along lines corresponding to intersections of the epipolar plane with the respective image planes, or their respective epipolar lines. After the images have been aligned based on their contents, an actual position of the object may be determined by triangulating lines extending from lenses, lens modules or other sensors of an imaging device through the representations of the points in the respective images within the imaging plane. An intersection of such lines corresponds to the actual position of the point, and a distance to the point may be determined accordingly based on this actual position. Stereo ranging algorithms and techniques may be used to determine ranges or distances to each of the points that appears in both of the images, and such ranges or distances may be used to define a point cloud, a depth map or another three-dimensional model of the environment in which the object is provided. The depth model may be stored in a data file (e.g., a depth image) or utilized for any purpose, including but not limited to navigation, guidance, surveillance or collision avoidance.

Stereo ranging algorithms and techniques thus require determining correspondences of the epipoles in each of the pair of images, with each of the epipoles corresponding to a common point in three-dimensional space. When a plurality of correspondences of epipoles are identified from each of a pair of images of a scene, disparities for each of the conjugate pairs of epipoles may be determined, and a map of such disparities that mimics a three-dimensional structure of the scene may be constructed accordingly if information regarding aspects of the scene, e.g., geometric parameters such as the baseline distance or separation, the focal lengths of the imaging devices and others, is known.

There are a number of computer-based stereo ranging algorithms and techniques for determining real-world positions of points expressed in pairs of images of scenes, and for generating depth maps, point clouds or other three-dimensional representations of such scenes based on such positions. Such algorithms or techniques may aid in the performance of calibration, correspondence and/or construction functions. For example, the Open Source Computer Vision (or "OpenCV") library includes a number of computer-based algorithms or other programming functions that are directed to determining distances or ranges from pairs of images. Similarly, a number of other stereo ranging algorithms or techniques programmed in the MATLAB language are publicly available. Computer-based algorithms or techniques are available from a number of other sources, as well.

Imaging devices may be integrated into surfaces of aerial vehicles and aligned horizontally or vertically, e.g., in forward or aft orientations, or in upward or downward orientations, or at any other orientations or angles, which may be relative or absolute. In some embodiments, two or more digital cameras may be integrated into frames, control surfaces, propulsion motors, propellers or any other aspects of an aerial vehicle. The digital cameras may be homogenous (e.g., functionally equivalent or having the same capacities) or, alternatively, heterogeneous (e.g., having different capacities), and stereo images captured by such cameras for determining depths may be processed in multiple calculations. In some embodiments, an aerial vehicle may include one or more imaging devices that are integrated into fixed or moving features of the aerial vehicle. Images captured by each of the imaging devices may be used for stereo ranging purposes, e.g., by determining baseline distances or separations between such imaging devices, disparities of objects within such images, and focal lengths of the respective imaging devices.

Figure 2:
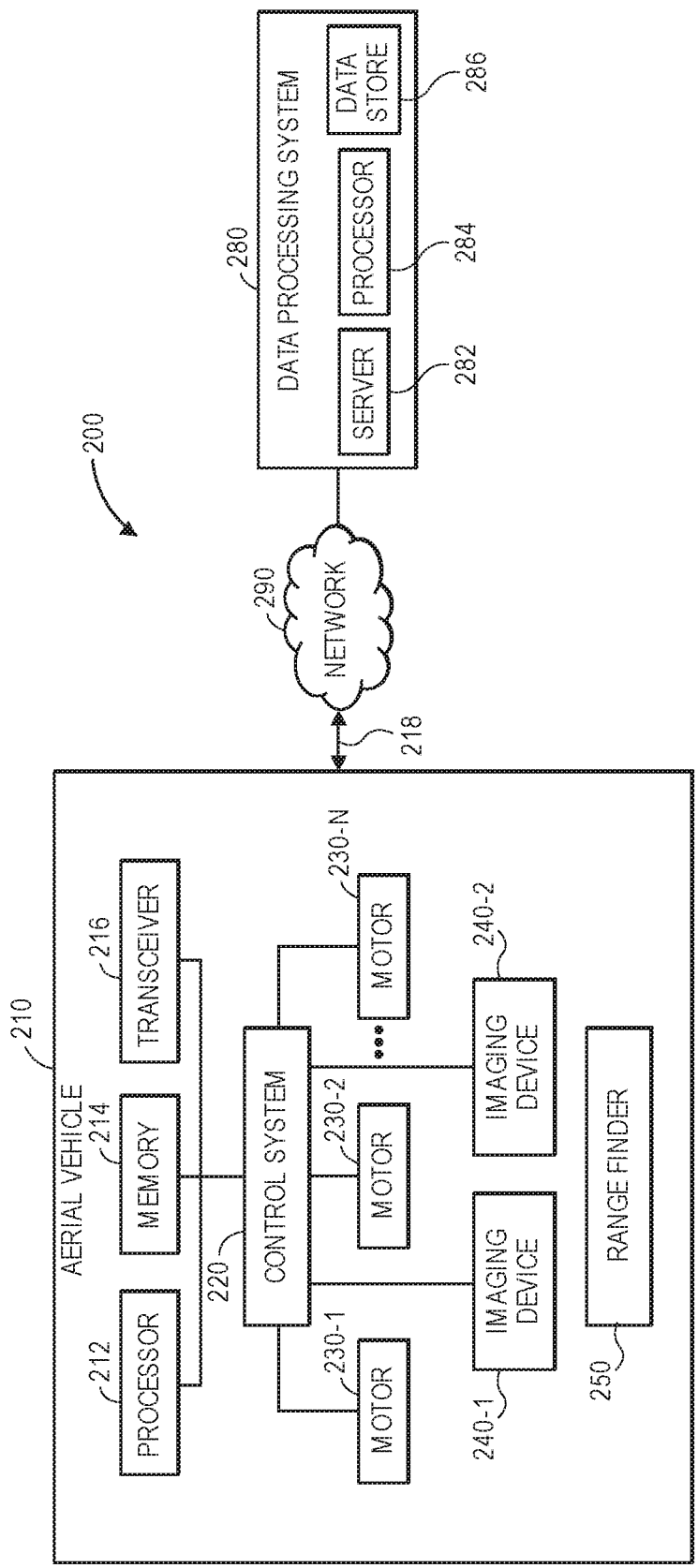
FIG. 2 is a block diagram of one system for object detection and avoidance in accordance with embodiments of the present disclosure.

Referring to FIG. 2, a block diagram of one system 200 for object detection and avoidance in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1I.

The aerial vehicle 210 includes a processor 212, a memory 214 and a transceiver 216. The aerial vehicle 210 further includes a control system 220, a plurality of propulsion motors 230-1, 230-2 . . . 230-n, imaging devices 240-1, 240-2 and a range finder 250.

The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the propulsion motors 230-1, 230-2 . . . 230-n, the imaging devices 240-1, 240-2 or the range finder 250. For example, the processor 212 may control the operation of one or more control systems or modules, such as the control system 220, for generating instructions for conducting operations of one or more of the propulsion motors 230-1, 230-2 . . . 230-n, the imaging devices 240-1, 240-2 or the range finder 250, either independently or in concert with one another. Such control systems or modules may be associated with one or more other computing devices or machines, and may communicate with the data processing system 280 or one or more other computer devices (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, flight paths, flight control parameters and/or other data items accessible by or to the processor 212. The memory 214 may be implemented using any suitable memory technology, such as static random-access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the propulsion motors 230-1, 230-2 . . . 230-$n$, the imaging devices 240-1, 240-2 or the range finder 250. For example, the control system 220 may cause one or more of the propulsion motors 230-1, 230-2 . . . 230-$n$ to rotate one or more propellers at desired speeds, in order to guide the aerial vehicle 210 along a determined or desired flight path. The control system 220 may also cause one or more of the imaging devices 240-1, 240-2 to capture any imaging data (e.g., still or moving images) as well as any associated audio data and/or metadata. The control system 220 may operate the range finder 250 to determine a range between the aerial vehicle 210 and one or more ground-based features (e.g., an altitude above such features), or a range between the aerial vehicle 210 and one or more airborne objects.

The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 230-1, 230-2 . . . 230-$n$ may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. For example, one or more of the propulsion motors 230-1, 230-2 . . . 230-$n$ may be a brushless direct current (DC) motor such as an outrunner brushless motor or an inrunner brushless motor.

The aerial vehicle 210 may include any number of such propulsion motors 230-1, 230-2 . . . 230-$n$ of any kind. In some embodiments, the aerial vehicle 210 may include two propulsion motors 230-1, 230-2 . . . 230-$n$. In some other embodiments, the aerial vehicle 210 may include three, four, five, six, seven, eight or more propulsion motors 230-1, 230-2 . . . 230-$n$. For example, one or more of the propulsion motors 230-1, 230-2 . . . 230-$n$ may be aligned or configured to provide forces of lift to the aerial vehicle 210, exclusively, while one or more of the propulsion motors 230-1, 230-2 . . . 230-$n$ may be aligned or configured to provide forces of thrust to the aerial vehicle 210, exclusively. Alternatively, one or more of the propulsion motors 230-1, 230-2 . . . 230-$n$ may be aligned or configured to provide forces of lift and forces of thrust to the aerial vehicle 210, as needed. Additionally, the propulsion motors 230-1, 230-2 . . . 230-$n$ may be fixed in their orientation on the aerial vehicle 210, or configured to vary their respective orientations, e.g., a tilt-rotor aircraft. Moreover, the propulsion motors 230-1, 230-2 . . . 230-$n$ may be aligned or configured to operate with different capacities or ratings, or at different speeds, or coupled to propellers having different sizes and shapes.

Each of the propulsion motors 230-1, 230-2 . . . 230-$n$ may be coupled to one or more propellers (or rotors or rotatable systems) having a plurality of shaped blades joined to a hub or boss. For example, each of such propellers may be rotatably mounted to a mast or shaft associated with a respective one of the propulsion motors 230-1, 230-2 . . . 230-$n$ and configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly.

The imaging devices 240-1, 240-2 may be any form of optical recording devices that are embedded or mounted to surfaces of the aerial vehicle 210, and may be used to photograph or otherwise record imaging data of structures, facilities, terrain or any other elements encountered during operation of the aerial vehicle 210, or for any other purpose. The imaging devices 240-1, 240-2 may include one or more sensors, memory or storage components and processors, and such sensors, memory components or processors may further include one or more photosensitive surfaces, filters, chips, electrodes, clocks, boards, timers or any other relevant features (not shown). Such imaging devices 240-1, 240-2 may capture imaging data in the form of one or more still or moving images of any kind or form, as well as any relevant audio signals or other information during the operation of the aerial vehicle 210.

The imaging devices 240-1, 240-2 may communicate with the processor 212 and/or the control system 220, or with one another, by way of a wired or wireless connection that may be dedicated or comprise all or part of an internal network (not shown). Additionally, the imaging devices 240-1, 240-2 may be adapted or otherwise configured to communicate with the data processing system 280 by way of the network 290. Although the block diagram 200 of FIG. 2 includes two boxes corresponding to the imaging devices 240-1, 240-2, those of ordinary skill in the pertinent arts will recognize that any number or type of imaging devices may be provided aboard the aerial vehicle 210 in accordance with the present disclosure, including but not limited to digital cameras, depth sensors or range cameras, infrared cameras, radiographic cameras or other optical sensors.

In addition to the imaging devices 240-1, 240-2, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The data processing system 280 includes one or more physical computer servers 282 having one or more computer processors 284 and any number of data stores 286 (e.g., databases) associated therewith, and may be provided for any specific or general purpose. For example, the data processing system 280 of FIG. 2 may be independently provided for the exclusive purpose of receiving, analyzing or storing imaging data or other information or data received from the aerial vehicle 210 or, alternatively, provided in connection with one or more physical or virtual services configured to receive, analyze or store such imaging data or other information or data, as well as one or more other functions. The servers 282 may be connected to or otherwise communicate with the processors 284 and the data stores 286, which may store any type of information or data, including but not limited to acoustic signals, information or data relating to imaging data, or information or data regarding environmental conditions, operational characteristics, or positions, for any purpose. The servers 282 and/or the computer processors 284 may also connect to or otherwise communicate with the network 290, as indicated by line 218, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 284, or any other computers or control systems utilized by the aerial vehicle 210 or the data processing system 280 (e.g., by one or more other aerial vehicles), and having sequences of instructions which, when executed by a processor (e.g., a central processing unit, or "CPU," or a graphics processing unit, or "GPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
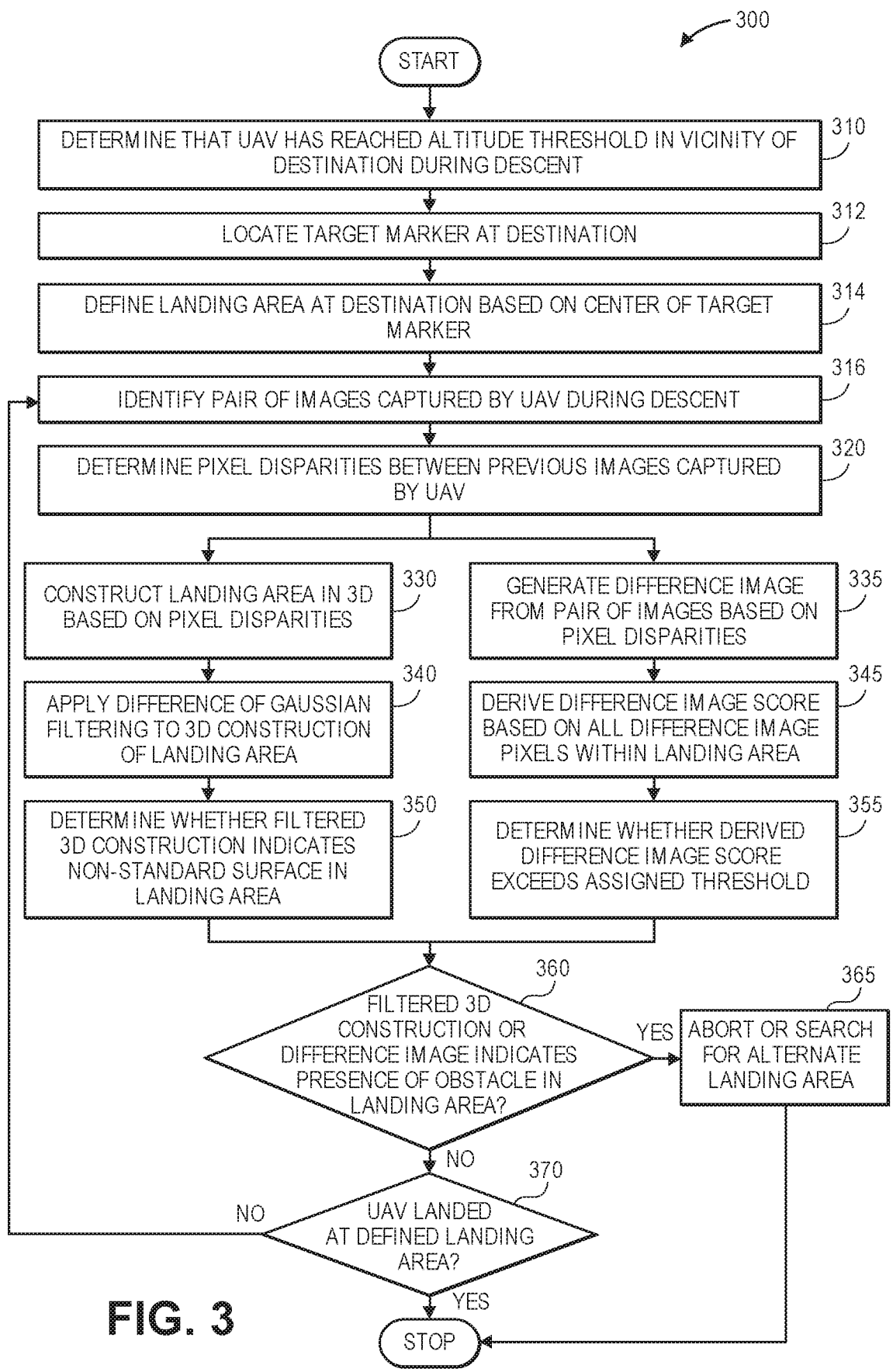
FIG. 3 is a flow chart of one process for object detection and avoidance in accordance with embodiments of the present disclosure.

As is discussed above, an aerial vehicle may be configured to determine whether a landing area is clear of obstacles using imaging data captured by one or more imaging devices that are embedded or otherwise integrated into one or more surfaces of the aerial vehicle. Referring to FIG. 3, a flow chart 300 of one process for object detection and avoidance in accordance with embodiments of the present disclosure is shown.

At box 310, the unmanned aerial vehicle determines that it has reached an altitude threshold within the vicinity of a destination during a descent. For example, the unmanned aerial vehicle may be equipped with one or more sensors, e.g., a laser range finder, configured to determine an altitude of the unmanned aerial vehicle with respect to one or more ground-based structures. Alternatively, the altitude of the unmanned aerial vehicle may be determined using one or more imaging devices, radar systems, sonic systems, Global Positioning System (or "GPS") components, or the like. Additionally, the altitude threshold may be defined on any basis. For example, the altitude threshold may be defined based on one or more attributes or characteristics of a mission being performed by the unmanned aerial vehicle, e.g., a mass of a payload. The altitude threshold may also be defined based on one or more attributes or characteristics of a destination for the mission, e.g., any number of humans, animals, structures or plant life at the destination. The altitude threshold may further be defined based on one or more legal or regulatory requirements in effect at the destination, or on any other factor.

At box 312, the unmanned aerial vehicle locates a target marker at the destination. For example, the target marker may be any visual fiducial marking that is applied to a surface at the destination, and is intended to be recognized by the unmanned aerial vehicle. The target marker may include any identifying marking such as one or more alpha-numeric characters, symbols, bar codes (e.g., one-dimensional or two-dimensional bar codes, such as "QR" codes) that may be imaged or scanned by the unmanned aerial vehicle and recognized as a desired location for landing thereon. For example, in some embodiments, the target marker may be formed from one or more layers of flexible and sufficiently durable materials such as natural or synthetic fibers (e.g., woven or non-woven fibers) or other substrates with one or more markings thereon. In some other embodiments, the target marker may be formed from paint, ink, chalk or any other materials applied to a landing surface. Alternatively, in some embodiments, the target marker may include one or more sensors or other components for transmitting signals to or receiving signals from the unmanned aerial vehicle, and the target marker may be located based on one or more of such signals.

At box 314, a landing area is defined at the destination based on a center of the target marker. For example, the landing area may be defined based on a predetermined radius extending from the center of the target marker. For example, a length, a width, a height or one or more other dimensions of the target marker may be determined, e.g., by one or more image segmentation techniques, and the center may be determined from such dimensions. The predetermined radius may be selected based on one or more attributes of the unmanned aerial vehicle, or a mission being performed by the unmanned aerial vehicle, as well as one or more safety factors or considerations associated with the destination for the unmanned aerial vehicle. Alternatively, the landing area may be defined based on any dimension of the target marker, other than the center. For example, the landing area may be defined based on a buffer or other predetermined distance from a perimeter of the target marker. In some embodiments, the landing area may be defined based on any point, e.g., a predetermined set of coordinates, regardless of whether that point is associated with a target marker.

At box 316, a pair of images captured by the unmanned aerial vehicle during the descent are identified. For example, the images may have been captured at the same time by two different imaging devices provided aboard the unmanned aerial vehicle, with the imaging devices having fields of view that overlap at least in part. Alternatively, the images may have been captured at different times by a single imaging device provided aboard the unmanned aerial vehicle. At box 320, pixel disparities between the images previously captured by the unmanned aerial vehicle are determined. For example, in some embodiments, the pixel disparities may be determined using one or more optical flow algorithms, which may determine disparities between corresponding points appearing within each of the images, along each of the dimensions of a two-dimensional image (e.g., both displacements in an x-dimension and parallax in ay-dimension). In some other embodiments, the pixel disparities may be determined using a stereo matching algorithm, which may determine disparities between corresponding points appearing within each of the images along a single dimension (e.g., displacements in an x-dimension). Where pixel disparities are determined using a stereo matching algorithm, each of the images is preferably captured by one of a pair of calibrated imaging devices and subsequently rectified, e.g., transformed onto a common plane, prior to providing the images as inputs to a stereo matching algorithm.

Where the pixel disparities are determined using an optical flow algorithm, the pixel disparities may be determined between each of the images of the pair at a lowest level of resolution, e.g., by initially downsampling and processing the images at a low resolution to determine disparities between corresponding sets of pixels. The images are then progressively upsampled in layers, and processed at progressively higher levels of resolution with the pixel disparities being revised until the images are at their original, maximum levels of resolution. The images may be processed in any number of layers. For example, in some embodiments, the images may be processed in seven layers. Additionally, the resolution of each of the layers may be progressively increased at any rate and in any manner, e.g., by a factor of two, for each of the layers.

After the pixel disparities have been determined at box 320, the images may be processed to reconstruct the landing area in three dimensions, and also to generate a difference image from the images, for at least portions of such images that depict the landing area. At box 330, the landing area is reconstructed in three dimensions based on the pixel disparities. For example, as is shown in FIG. 1F, the landing area may be reconstructed in three-dimensional space using each of the disparities that are associated with corresponding points (e.g., each of the epipoles of a conjugate pair) appearing within each of the images. The landing area may be reconstructed based on a baseline distance between each of the imaging devices that captured the images, e.g., by triangulating each of the points with respect to image sensors of the imaging devices and their focal lengths.

At box 340, difference of Gaussian filtering is applied to the three-dimensional reconstruction of the landing area. The difference of Gaussian filtering is applied to subtract low frequencies corresponding to a ground level of the unobstructed landing area, which is presumably flat, unobstructed, and provided at an acceptable slope, from the three-dimensional reconstruction. Alternatively, any type or form of filtering may be applied to the three-dimensional reconstruction of the landing area determined at box 330.

At box 350, whether the filtered three-dimensional reconstruction indicates the presence of a non-standard surface within the landing area is determined. For example, if the filtered three-dimensional reconstruction indicates that a portion of the landing area is neither flat nor unobstructed, nor provided at an acceptable slope, the landing area may be determined to have one or more obstacles located thereon. If the filtered three-dimensional reconstruction is consistent with the presumably flat and unobstructed landing area, however, or if any such obstacles are sufficiently small or insignificant, then the landing area may be determined to be free of obstacles, or to include obstacles that are not substantial enough to preclude the aerial vehicle from landing safely.

In parallel, at box 335, a difference image is generated based on the pair of images. For example, absolute intensities, or gradients in intensities, that are derived from one of the images may be subtracted from another of the images, thereby warping the images onto one another. At box 345, a difference image score is derived for pixels of the difference image that correspond to the landing area. The difference image score may indicate an extent to which the pixels of the respective images differ from one another within the landing area. The difference image score may be based on pixel values according to the RGB color model or any other model or standard. For example, the difference image score may indicate a peak difference, a mean difference, a median difference, or any other difference between such pixels between intensity values of corresponding pixels of the respective images. The difference image score may also indicate a number of pixels having differences in intensity values above a predetermined threshold. The difference image score may further indicate whether such pixels define an area that is sufficiently large, thereby corresponding to an object that could pose a threat to the safe operation of the aerial vehicle, or whether such pixels correspond to an object of insignificant size, or an object that poses an insubstantial threat to the safe operation of the aerial vehicle.

At box 355, whether the difference image score exceeds an assigned threshold is determined. The assigned threshold may be determined and assigned to a landing area and/or an aerial vehicle on any basis. For example, the assigned threshold may be based on a value of the difference image score for a single pixel of the difference image, or for one or more regions of pixels of the difference image. Additionally, the assigned threshold may correspond to one or more attributes of the landing area, the aerial vehicle, or a mission being performed by the aerial vehicle, or any other factor. For example, an assigned threshold may be defined with respect to one or more dimensions or attributes of an aerial vehicle (e.g., a size, a shape, a number of rotating propellers, an operating speed of the rotating propellers, or any other relevant attribute), a landing area or destination, a mission being performed by the aerial vehicle, or any other factor. If the difference image score exceeds the assigned threshold, then the landing area may be determined to have one or more obstacles thereon. If the difference image score does not exceed the assigned threshold, however, then the landing area may be determined to be free from obstacles, or to include obstacles that are not substantial enough to preclude the aerial vehicle from landing safely.

At box 360, whether either the filtered reconstruction of the landing area or the difference image indicates the presence of one or more obstacles in the landing area is determined. If the filtered reconstruction indicates that the landing area is not flat, unobstructed and at an acceptable slope, as presumed, or if the difference image indicates that one or more obstacles lies on or over the landing area, then the process advances to box 365, where the landing operation is aborted, or the aerial vehicle attempts to identify an alternate landing area, and the process ends. The alternate landing area may be designated by one or more individuals associated with the destination, or identified at the destination by the aerial vehicle, e.g., based on one or more images captured thereby, or in any other manner. In some embodiments, an output of one or more algorithms (e.g., a difference image algorithm or a construction algorithm) may be a confidence level or score indicative of a probability that the landing area includes one or more obstacles.

Alternatively, the aerial vehicle may be programmed or otherwise configured to take any number of other actions when either the filtered reconstruction of the landing area or the difference image indicates the presence of one or more obstacles in the landing area. For example, a rate of descent of the aerial vehicle may be reduced or halted, e.g., by transitioning to a hovering mode, until the obstacles may be determined to have been cleared from the landing area. Slowing a rate of descent or hovering may be particularly helpful where the obstacle is dynamic in nature, such as a human, an animal or an object in motion. For example, where a dynamic obstacle is identified within one or more images, the dynamic obstacle may be tracked throughout the landing area until the dynamic obstacle has departed from the landing area, or no longer poses a hazard to the aerial vehicle. Additionally, any number of other pairs of images may be evaluated to confirm whether a determination that the landing area includes one or more obstacles is accurate, or to a sufficiently high degree of confidence. The aerial vehicle may also transmit one or more signals or messages to a ground-based or air-based control system, reporting the status of the landing area, and may receive one or more signals or messages from the control system including one or more instructions for future operations.

If neither the filtered reconstruction nor the difference image indicates that any obstacles are present in the landing area (e.g., on or above the landing area), then the process advances to box 370, where whether the unmanned aerial vehicle has landed at the defined landing area is determined. If the unmanned aerial vehicle has landed, i.e., if the unmanned aerial vehicle has completed its descent, then the process ends. If the unmanned aerial vehicle has not landed, then the process returns to box 316, where a pair of images captured by the unmanned aerial vehicle during the descent is identified, and to box 320, where pixel disparities between the previous images captured by the unmanned aerial vehicle are determined. The pair of images may include one of the images that was included in the pair that was previously identified at box 316, along with another image, e.g., where the images are captured in series. Alternatively, the pair of images may include two images that were not included in any pair that was previously identified at box 316.

Although the flow chart 300 of FIG. 3 describes one process for generating a reconstruction of the landing area in three dimensions and a difference image in parallel following a determination of the pixel disparities between the previous images, in some embodiments, the reconstruction of the landing area in three dimensions and the generation of a difference image may occur in series. Moreover, although the flow chart 300 of FIG. 3 indicates that a landing operation may be aborted, or an alternate landing area may be identified, where either the filtered reconstruction of the landing area or the difference image indicates the presence of one or more obstacles in the landing area based on pixel disparities identified for a single pair of images, in some embodiments, a determination to abort a landing operation or to search for an alternate landing area may be made based on pixel disparities identified in multiple pairs of images, e.g., after a predetermined number of filtered reconstructions or difference images indicates that a landing area includes one or more obstacles or obstructions. In such embodiments, aborting a landing operation or searching for an alternate landing area may be avoided where one or more obstacles or obstructions is identified in a spurious or random manner, e.g., in only a single pair of images.

Moreover, the systems and methods of the present disclosure may be utilized to identify landing areas for aerial vehicles even where a target marker is not utilized. For example, one or more of the embodiments disclosed herein may be utilized to identify a sufficiently sized landing area that is flat and free of obstacles or obstructions in an environment by comparing pairs of images captured of the environment. Areas that are sufficiently sized and flat, e.g., to accommodate an aerial vehicle, may be identified accordingly. Furthermore, one or more of the systems and methods disclosed herein may be utilized in connection with an operating area that is not associated with a ground-based point, e.g., an airborne space defined by one or more sets of coordinates, or for operations that do not include a landing evolution. For example, where the aerial vehicle transitions from a current altitude to a desired altitude, without landing, one or more of the systems and methods of the present disclosure may determine whether any obstructions remain between the aerial vehicle and the desired altitude. In some embodiments, an aerial vehicle may be equipped with one or more imaging devices that are aligned in a vertically downward orientation, or in a substantially vertically downward orientation, with respect to one or more principal axes of the aerial vehicle, and configured to capture imaging data regarding one or more surfaces or other objects that are located beneath the aerial vehicle, such as is shown in FIG. 1D. Alternatively, in some embodiments, an aerial vehicle may be equipped with one or more imaging devices that are aligned in a vertically upward orientation, or in a substantially vertically upward orientation, with respect to one or more principal axes of the aerial vehicle, and configured to capture imaging data regarding one or more surfaces or other objects that are located above the aerial vehicle. In some embodiments, an aerial vehicle may be equipped with one or more imaging devices that are aligned at any other angle with respect to the one or more principal axes of the aerial vehicle, and configured to capture imaging data regarding one or more surfaces or other objects that are located along such axes.

Figure 4:
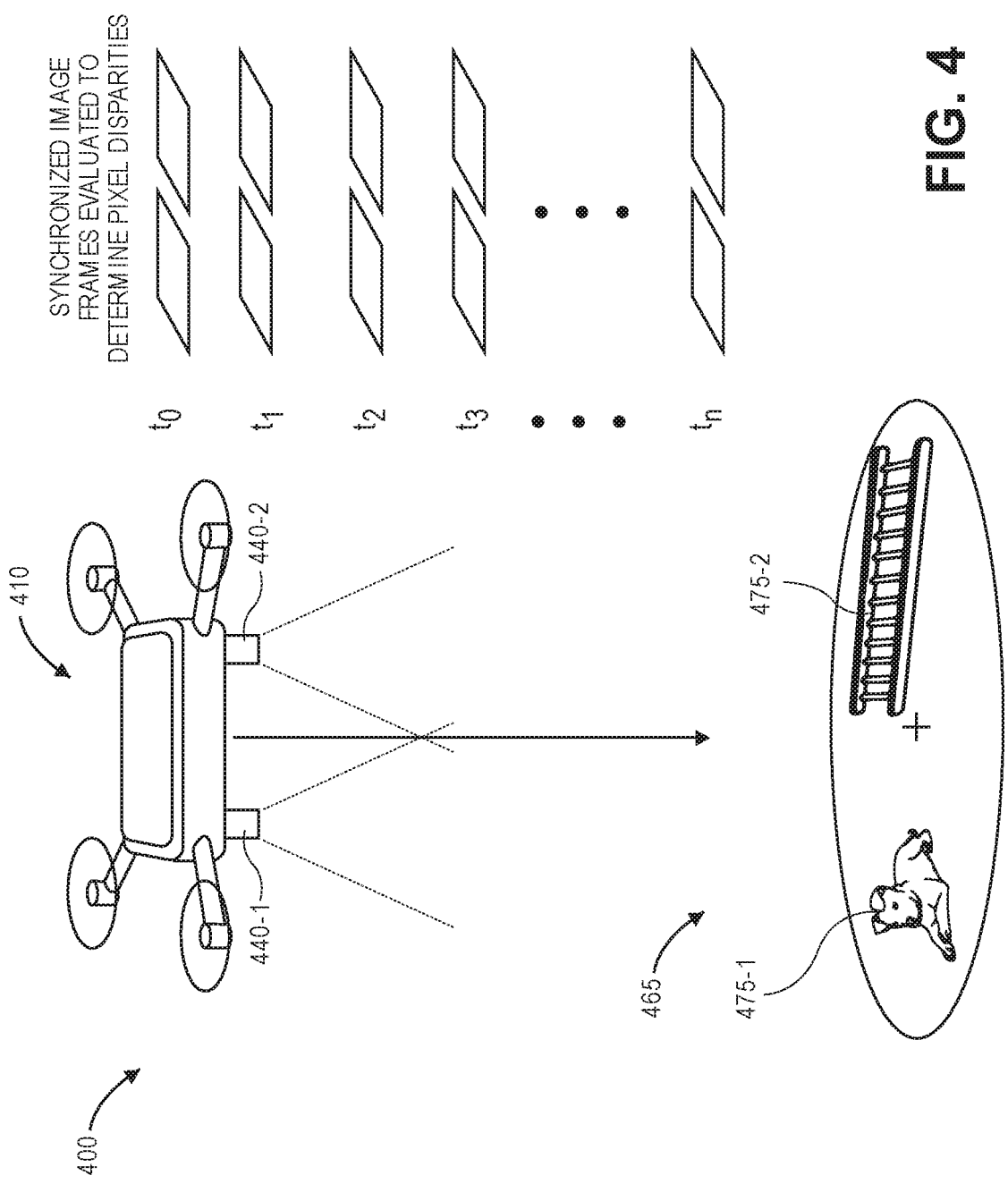
FIG. 4 is a view of aspects of one system for object detection and avoidance in accordance with embodiments of the present disclosure.

In some embodiments, the systems and methods of the present disclosure may determine pixel disparities from one or more pairs of images captured simultaneously (e.g., synchronized images) using multiple imaging devices. Referring to FIG. 4, a view of aspects of one system for object detection and avoidance in accordance with embodiments of the present disclosure is shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1I.

As is shown in FIG. 4, a system 400 includes an aerial vehicle 410 approaching a landing area 465. The aerial vehicle 410 is outfitted with a pair of imaging devices 440-1, 440-2 that are aligned in substantially vertically downward orientations with respect to principal axes (e.g., normal axis, lateral axis, longitudinal axis) of the aerial vehicle 410, and include one or more surface features within their respective fields of view, which overlap at least in part. In some embodiments, the landing area 465 may be defined upon recognizing a fiducial marking of any type or form (e.g., the target marker 160 of FIG. 1A) on the one or more surface features. For example, one or more points associated with a fiducial marking may be detected, and boundaries of the landing area 465 may be established with respect to such points, e.g., based on a predetermined radius from a given point, or based on any other boundary provided about the given point. In other embodiments, however, the landing area 465 may be defined at any time or in any manner, and on any basis. For example, the landing area 465 may be defined based on any point, e.g., a point defined based on one or more sets of coordinates, regardless of whether the point is associated with a target marker or any other object.

The capture of images by the imaging devices 440-1, 440-2 may be initiated or triggered in any manner. For example, the aerial vehicle 410 may determine that it is approaching a predetermined ground-based location or altitude (e.g., using one or more position sensors, such as a GPS transceiver, or an altimeter or other system), and may begin capturing imaging data upon approaching the predetermined ground-based location or altitude. Alternatively, the aerial vehicle 410 may be configured to determine when it is approaching one or more ground-based or airborne features, e.g., structures, aircraft, animals or any other objects, or when one or more ground-based or airborne features are approaching it, such as by using one or more radar systems, sonic systems or imaging devices. The aerial vehicle 410 may thus begin capturing imaging data upon determining that the aerial vehicle 410 is approaching such features, or upon determining that such features are approaching the aerial vehicle 410. The aerial vehicle 410 may also begin to capture imaging data at a predetermined time or date.

The imaging devices 440-1, 440-2 of the aerial vehicle 410 may begin to capture images, or may continue capturing images, as the aerial vehicle 410 descends toward the landing area 465. For example, as is shown in FIG. 4, the imaging devices 440-1, 440-2 may capture pairs of images at time $t_0$, time $t_1$, time $t_2$, time $t_3$ . . . until time $t_n$, when the aerial vehicle 410 has landed at the landing area 465, when the landing operation has been aborted, or when the capture of images by the imaging devices 440-1, 440-2 has been terminated for any reason. In some embodiments, the imaging devices 440-1, 440-2 may be configured to capture images in series, e.g., at a predetermined or constant frame rate, or at specific intervals.

Pairs of images captured by the imaging devices 440-1, 440-2 may be processed to recognize pixel disparities therebetween, according to any methods or techniques. For example, an image captured by the imaging device 440-1 at a given time (e.g., one or more of time $t_0$, time $t_1$ time $t_2$, time $t_3$ or time $t_n$), and an image captured by the imaging device 440-2 at the same time may be provided to an optical flow algorithm as inputs. The optical flow algorithm may return a field of vectors representing disparities of pixels from an image captured by the imaging device 440-1 at a given time and an image captured by the imaging device 440-2 at the given time, or vice versa. The optical flow algorithm may operate in a sparse or a dense manner, based on some or all of the pixels in the images captured by the respective imaging devices 440-1, 440-2. For example, in some embodiments, portions of the respective images corresponding to or depicting the landing area 465 may be recognized and extracted therefrom. An optical flow algorithm may operate in a sparse manner, and may generate a sparse reconstruction of the landing area 465 based on disparities between portions of the respective images that correspond to the landing area 465.

The pixel disparities may be used to generate three-dimensional reconstructions of the landing area 465, and to determine whether such reconstructions are flat and smooth, or whether such reconstructions include one or more obstructions that inhibit a landing operation or other evolution thereon.

Alternatively, an image captured by the imaging device 440-1 at a given time (e.g., one or more of time $t_0$, time $t_1$, time $t_2$, time $t_3$ or any time $t_0$), and an image captured by the imaging device 440-2 at the same time or at approximately the same time may be provided to a stereo matching algorithm as inputs, and a plurality of disparities (e.g., vectors having horizontal and/or vertical directional components) between pixels of one of the images and pixels of another of the images may be returned as an output. In some embodiments, the images may be rectified prior to executing the stereo matching algorithm, thereby ensuring that the pixel disparities identified within such images are limited to a single direction, e.g., horizontal or vertical, or any other single direction.

Figure 5:
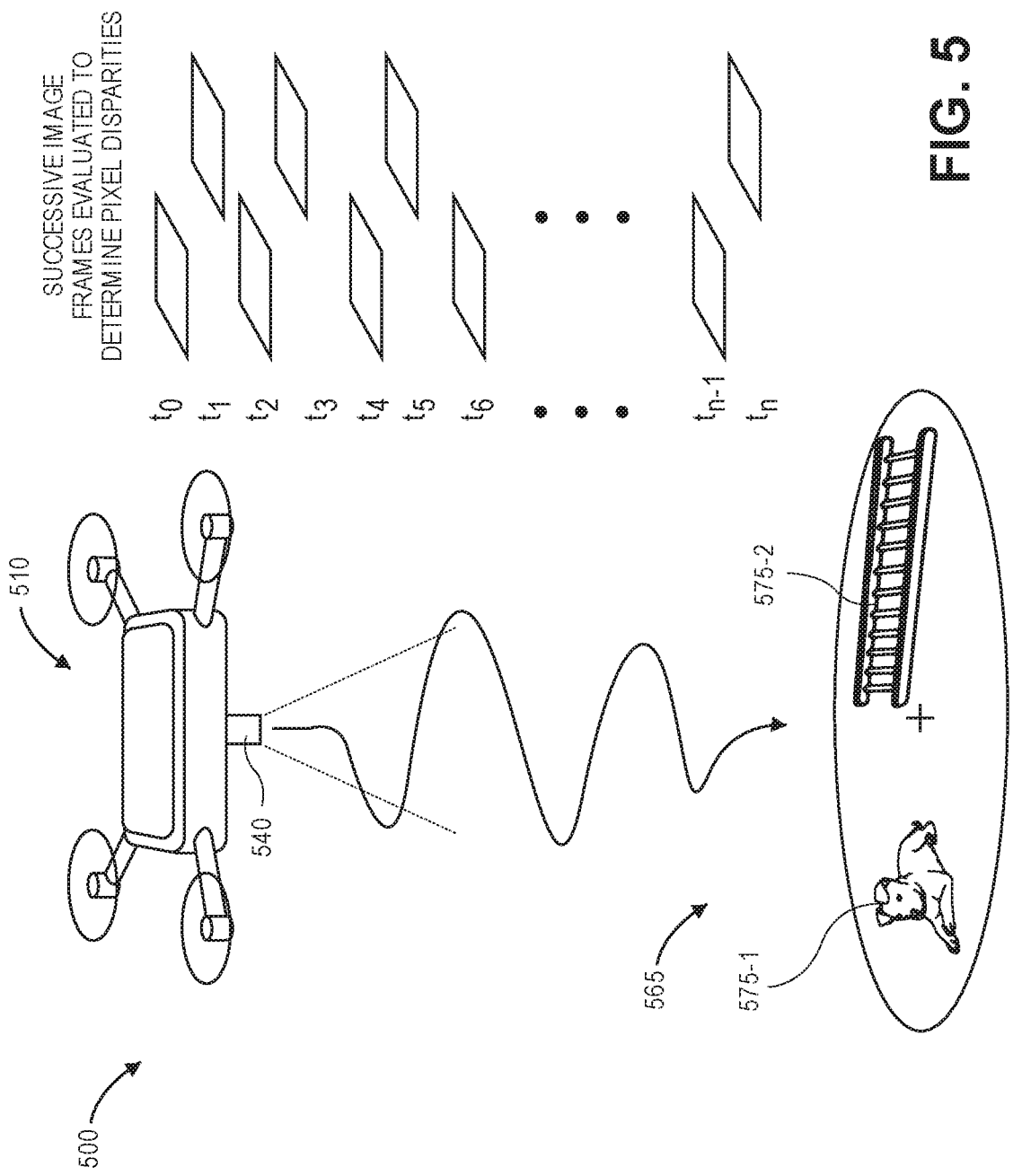
FIG. 5 is a view of aspects of one system for object detection and avoidance in accordance with embodiments of the present disclosure.

In some embodiments, the systems and methods of the present disclosure may determine pixel disparities from one or more pairs of images captured at different times using a single imaging device. Referring to FIG. 5, a view of aspects of one system for object detection and avoidance in accordance with embodiments of the present disclosure is shown. Except where otherwise noted, reference numerals preceded by the number "5" shown in FIG. 5 indicate components or features that are similar to components or features having reference numerals preceded by the number "4" shown in FIG. 4, by the number "2" shown in FIG. 2 or by the number "1" shown in FIGS. 1A through 1I.

As is shown in FIG. 5, a system 500 includes an aerial vehicle 510 approaching a landing area 565. The aerial vehicle 510 is outfitted with an imaging device 540 that is aligned in a substantially vertically downward orientation with respect to principal axes (e.g., normal axis, lateral axis, longitudinal axis) of the aerial vehicle 510, and includes one or more surface features within their respective fields of view. The landing area 565 may be defined on any basis, e.g., based on one or more fiducial markings.

The imaging device 540 may capture images in series, e.g., in a streaming format, or at a predetermined interval. The capture of the images by the imaging device 540 may be initiated or triggered in any manner, at any time and on any basis. For example, the aerial vehicle 510 may be configured to begin capturing images upon determining that the aerial vehicle 510 has arrived at a predetermined location or altitude, upon determining that the aerial vehicle 510 has approached or is approaching a ground-based or airborne object, or at a predetermined time, or on any other basis.

Pairs of images captured by the imaging device 540 may be processed to recognize pixel disparities therebetween, according to any methods or techniques. For example, an image captured by the imaging device 540 at a given time (e.g., one or more of time $t_0$, time $t_1$, time $t_2$, time $t_3$, time $t_4$, time $t_5$, time $t_6$, time $t_{n-1}$ or time $t_n$), and an image captured by the imaging device 540 at another time (e.g., another of the time $t_0$, time $t_1$, time $t_2$, time $t_3$, time $t_4$, time $t_5$, time $t_6$, time $t_{n-1}$ or time $t_n$) may be provided to an optical flow algorithm as inputs. The optical flow algorithm may return a field of vectors representing disparities of pixels from a first one of the images to a second one of the images, or vice versa. The pixel disparities may be used to generate three-dimensional reconstructions of the landing area 565, and to determine whether such reconstructions are flat and smooth, or whether such reconstructions include one or more obstructions that inhibit a landing operation or other evolution thereon. Alternatively, an image captured by the imaging device 540 at a given time (e.g., one or more of time $t_0$, time $t_1$, time $t_2$, time $t_3$, time $t_4$, time $t_5$, time $t_6$, time $t_{n-1}$ or time $t_n$), and an image captured by the imaging device 540 at a later time may be provided to stereo matching algorithm as inputs, and a plurality of disparities (e.g., vectors having horizontal and/or vertical directional components) between pixels of one of the images and pixels of another of the images may be returned as an output. In some embodiments, the images may be rectified prior to executing the stereo matching algorithm, thereby ensuring that the pixel disparities identified within such images are limited to a single direction, e.g., horizontal or vertical, or any other single direction.

In some embodiments, the aerial vehicle 510 may be programmed or otherwise configured to conduct one or more lateral variations in position during operations, in order to create some form of lateral separation between positions of the imaging device 540 at the time $t_0$, time $t_1$, time $t_2$, time $t_3$, time $t_4$, time $t_5$, time $t_6$, time $t_{n-1}$ or time $t_n$. For example, during a landing operation or other operation in which the imaging device 540 is operated to capture images during a descent or hover, the aerial vehicle 510 may operate one or more control surfaces or stagger the operation of one or more propulsion motors, or any other aspect of the aerial vehicle 510, as desired, to cause the aerial vehicle 510 to deviate from a vertical axis. By varying the position of the imaging device 540 with respect to the vertical axis, the aerial vehicle 510 may implement or expand a baseline distance between such positions, thereby enhancing a level of accuracy of pixel displacements determined based on images captured by the imaging device 540.

Figure 6:
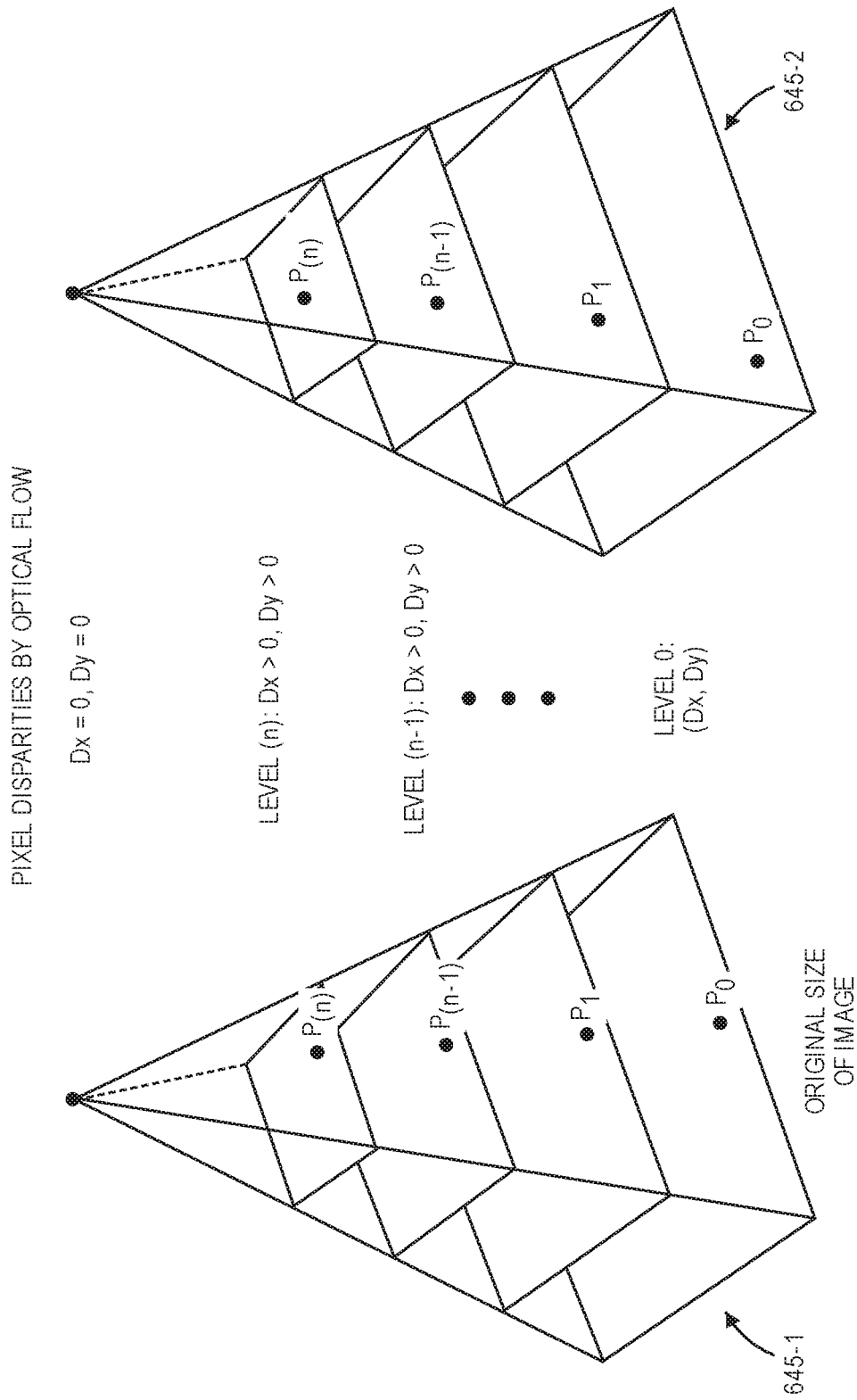
FIG. 6 is a view of aspects of one system for object detection and avoidance in accordance with embodiments of the present disclosure.

Disparities between pixels may be determined by any method or technique in accordance with the present disclosure. For example, in some embodiments, pixel disparities may be determined using one or more optical flow algorithms, which may determine such discrepancies. Referring to FIG. 6, a view of aspects of one system for object detection and avoidance in accordance with embodiments of the present disclosure is shown. Except where otherwise noted, reference numerals preceded by the number "6" shown in FIG. 6 indicate components or features that are similar to components or features having reference numerals preceded by the number "5" shown in FIG. 5, by the number "4" shown in FIG. 4, by the number "2" shown in FIG. 2 or by the number "1" shown in FIGS. 1A through 1I.

As is shown in FIG. 6, the identification of a common pixel $P_n$ in images 645-1, 645-2 captured using one or more imaging devices (not shown) is represented by a pair of image pyramids. The images 645-1, 645-2 may have been captured using a single imaging device at different times, such as is shown in FIG. 5, or using two imaging devices, at the same time (e.g., synchronized) or different times, such as is shown in FIG. 4. For example, at a first level of refinement, e.g., a most coarse level of refinement, or level n, the pixel $P_n$ is readily apparent within each of the images 645-1, 645-2, at no disparity in either a horizontal or a vertical direction, such that $D_x=0$ and $D_y=0$. Successively, as the images 645-1, 645-2 are subjected to increasing refinement, and the disparities between the appearance of the pixel $P_n$ within the respective images 645-1, 645-2 become increasingly clearer at subsequent levels of refinement (n−1), (n−2), and so on, until the precise disparities that $D_x$, $D_y$, are determined at a final level of refinement, or level 0.

Any number of optical flow algorithms may be utilized in accordance with the present disclosure, and such algorithms may operate in accordance with any manner or technique. For example, in some embodiments, an optical flow algorithm may operate according to a Lucas-Kanade method, in which a field of vectors signifying pixel disparities between a pair of images is generated. Additionally, the optical flow algorithm may be sparse, such as the Lucas-Kanade method, in which a subset of the common pixels are evaluated to identify and calculate the respective disparities therebetween, and an output in the form of an optical flow vector field is computed for each of the respective pixels. Alternatively, the optical flow algorithm may be dense, such that each of the pixels of the respective images are evaluated to identify and calculate the respective disparities therebetween. In some embodiments, where a pair of images depict all or a portion of a landing area, the portions of such images that depict the landing area may be extracted therefrom, and subjected to a sparse optical flow algorithm in order to identify the disparities between their respective pixels. Such disparities may be used to generate a three-dimensional reconstruction of the landing area, or to generate a difference image of the landing area.

Figure 7A:
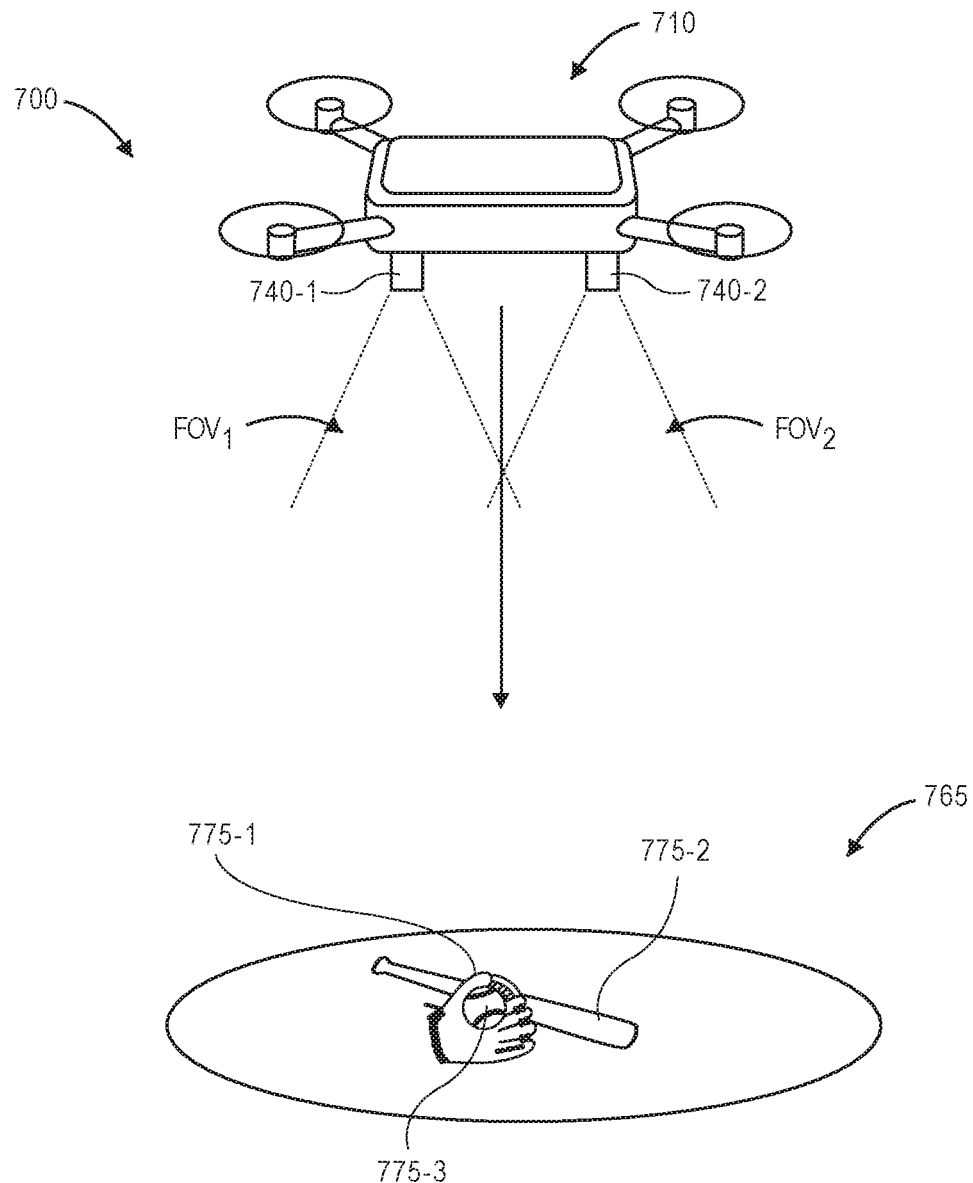
FIGS. 7A and 7B are views of aspects of one system for object detection and avoidance in accordance with embodiments of the present disclosure.
Figure 7B:
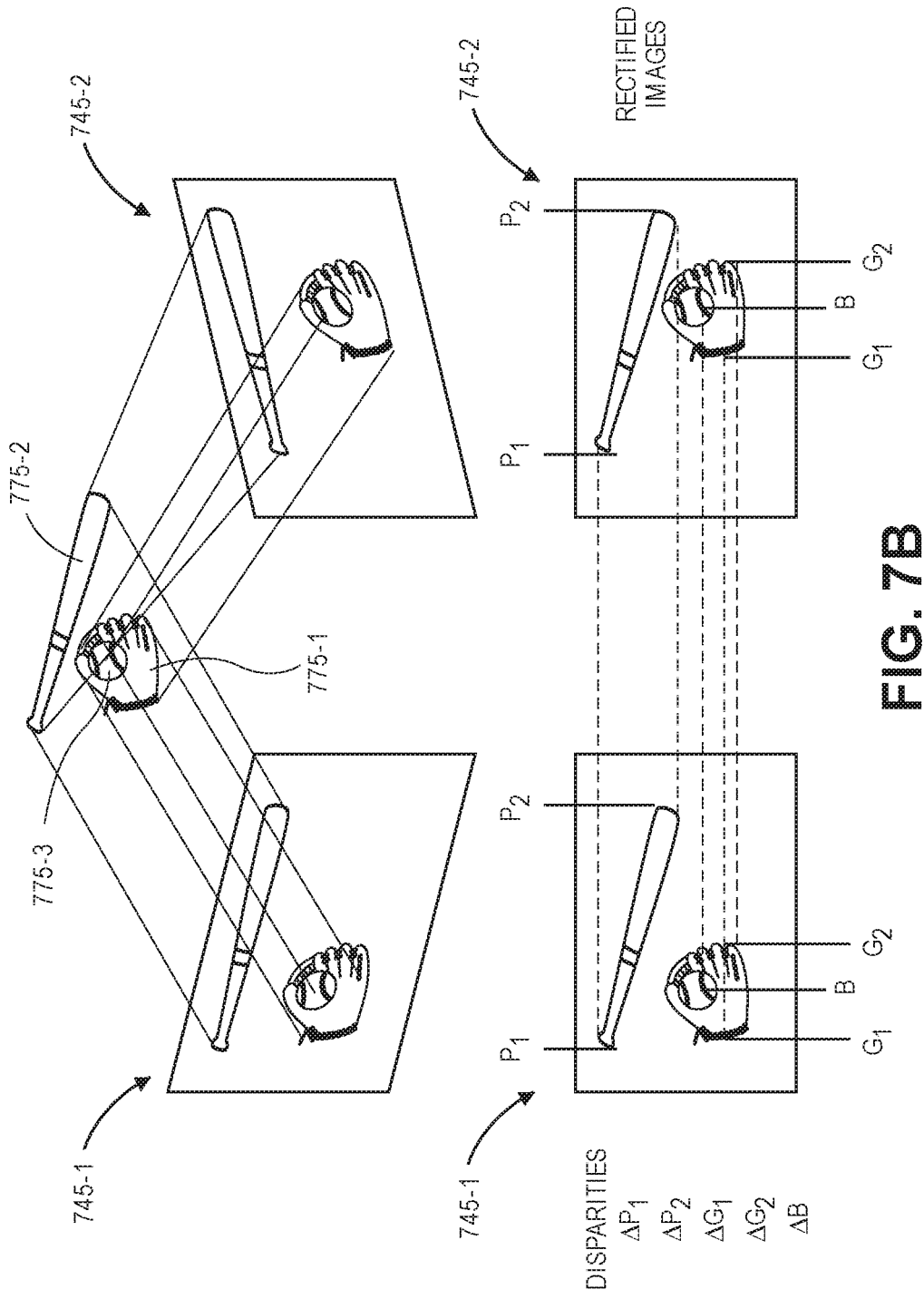

Pixel disparities may also be determined using a stereo-matching algorithm. Referring to FIGS. 7A and 7B, views of aspects of one system for object detection and avoidance in accordance with embodiments of the present disclosure is shown. Except where otherwise noted, reference numerals preceded by the number "7" shown in FIG. 7A or 7B indicate components or features that are similar to components or features having reference numerals preceded by the number "6" shown in FIG. 6, by the number "5" shown in FIG. 5, by the number "4" shown in FIG. 4, by the number "2" shown in FIG. 2 or by the number "1" shown in FIGS. 1A through 1I.

As is shown in FIG. 7A, a system 700 includes an aerial vehicle 710 approaching a landing area 765. The aerial vehicle 710 is outfitted with a pair of imaging devices 740-1, 740-2, each having fields of view $FOV_1$, $FOV_2$ that overlap at least in part and include at least a portion of the landing area 765 and one or more other surface features therein. The imaging devices 740-1, 740-02 are aligned in substantially vertically downward orientations with respect to principal axes (e.g., normal axis, lateral axis, longitudinal axis) of the aerial vehicle 710. The landing area 765 may be defined on any basis, e.g., based on one or more fiducial markings. As is shown in FIG. 7A, the landing area 765 includes a plurality of objects 775-1, 775-2, 775-3 thereon.

In accordance with the present disclosure, images 745-1, 745-2 captured using the respective imaging devices 740-1, 740-2 may be processed using one or more stereo matching algorithms. As is shown in FIG. 7B, each of the pixels of the image 745-1 may be warped onto one of the pixels of the image 745-2, or vice versa, according to a deformation model, or in any other manner. Prior to warping the pixels of the respective images 745-1, 745-2, the images 745-1, 745-2 may be rectified, or aligned such that corresponding epipolar lines are parallel to one another. For example, as is shown in FIG. 7B, points $G_1$, $G_2$ of the object 775-1 in each of the images 745-1, 745-2 are aligned by rectification, and disparities $\Delta G_1$, $\Delta G_2$ between pixels corresponding to such points within the respective images 745-1, 745-2, e.g., differences between positions of the points $G_1$, $G_2$ of the object 775-1 in each of the images 745-1, 745-2 may be determined in a horizontal direction (e.g., displacements) with respect to one another. Because the images 745-1, 745-2 are rectified, the disparities between the pixels consist of horizontal displacements, and do not include any vertical parallax. Similarly, as is shown in FIG. 7B, points $P_1$, $P_2$ of the object 775-2 in each of the images 745-1, 745-2 are aligned by rectification, and disparities $\Delta P_1$, $\Delta P_2$ between pixels corresponding to such points within the respective images 745-1, 745-2, e.g., differences between positions of the points $P_1$, $P_2$ of the object 775-2 in each of the images 745-1, 745-2 may be determined in a horizontal direction with respect to one another. Finally, as is also shown in FIG. 7B, a point B of the object 775-3 in each of the images 745-1, 745-2 is aligned by rectification, and a disparity $\Delta B$ between pixels corresponding to such points within the respective images 745-1, 745-2, e.g., differences between positions of the point B of the object 775-3 in each of the images 745-1, 745-2 may be determined in a horizontal direction with respect to one another. As is discussed above, the use of rectified images captured by calibrated imaging devices ensures that epipolar lines between the respective positions $G_1$, $G_2$, $P_1$, $P_2$, B are aligned in parallel with one another, and that the disparities $\Delta G_1$, $\Delta G_2$, $\Delta P_1$, $\Delta P_2$, $\Delta B$ consist of horizontal displacements, and do not include any vertical parallax.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

As used herein, the terms "forward" flight or "horizontal" flight refer to flight in a direction substantially parallel to the ground (i.e., sea level). As used herein, the term "vertical" flight refers to flight in a direction extending substantially radially outward from a center of the Earth. Those of ordinary skill in the pertinent arts will recognize that flight trajectories may include components of both "forward" flight or "horizontal" flight and "vertical" flight vectors. As used herein, the term "disparity" may be used to refer to differences in positions of a common pixel or pixel in two different image frames. Thus, the term "disparity" may refer to horizontal differences in position, which are sometimes referred to as "displacements," vertical differences in position, which are sometimes referred to as "parallax," or differences in position that are both horizontal and vertical, or aligned along any other axis, in accordance with the present disclosure. In this regard, the terms "disparity," "displacement" or "parallax" may be used interchangeably to refer to differences in position of a pixel or pixels in two or more image frames. Moreover, as used herein, the terms "obstacle" and "obstruction" may refer to any object that may be present, temporarily or permanently, within an operating area of an aerial vehicle. For example, an obstacle or an obstruction may be static or dynamic, e.g., mobile, such as a human, an animal or an object such as a bicycle, a tricycle, a stroller, a skateboard or a ball. The terms "obstacle" and "obstruction" are used interchangeably herein.

Although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use. Moreover, those of ordinary skill in the pertinent arts will recognize that one or more of the embodiments disclosed herein may be utilized in connection with any operation of an aerial vehicle, and are not limited to landing operations. For example, where an aerial vehicle is programmed or instructed to perform a surveillance operation requiring forward or vertical flight, or hovering, in a given area, the aerial vehicle may capture images and determine disparities between pixels represented within such images when determining whether the given area is free and clear of obstructions, or whether operations within the given area may be safely performed as desired or intended. As is discussed above, where a landing area is defined in two dimensions, e.g., with respect to a two-dimensional surface, whether a landing operation may safely occur may be determined by calculating pixel disparities and using the pixel disparities to generate both a three-dimensional reconstruction of a landing area and a difference image for the landing area. In accordance with the present disclosure, an operating area may be defined either in two dimensions (e.g., a planar region in space) or in three dimensions (e.g., a volumetric region in space), and the operating area may but need not be associated with any given surface. In some embodiments, the systems and methods of the present disclosure may be used to determine whether a two-dimensional region in space, or a three-dimensional region in space, includes one or more obstacles or obstructions that may preclude, inhibit or complicate the performance of one or more evolutions within such regions by an aerial vehicle.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method for operating an unmanned aerial vehicle, the method comprising:
    locating, by at least one imaging device provided on the unmanned aerial vehicle, a target marker on a surface beneath the unmanned aerial vehicle;
    defining a landing area based at least in part on at least a portion of the target marker, wherein the landing area comprises a geometric shape defined with respect to the portion of the target marker;
    causing the unmanned aerial vehicle to descend toward the surface beneath the unmanned aerial vehicle;
    capturing, by the at least one imaging device, a first image including at least a portion of the surface beneath the unmanned aerial vehicle, wherein the first image is captured while the unmanned aerial vehicle is descending toward the surface beneath the unmanned aerial vehicle;
    capturing, by the at least one imaging device, a second image including at least a portion of the surface beneath the unmanned aerial vehicle, wherein the second image is captured while the unmanned aerial vehicle is descending toward the surface beneath the unmanned aerial vehicle;
    determining disparities between pixels corresponding to at least a plurality of points depicted in the first image and pixels corresponding to at least the plurality of points depicted in the second image;
    generating a reconstruction of at least the landing area based at least in part on the disparities;
    detecting at least one airborne obstruction above at least a portion of the landing area based at least in part on the reconstruction; and
    in response to detecting the at least one airborne obstruction,
        causing the aerial vehicle to stop descending toward the surface beneath the unmanned aerial vehicle.

2. The method of claim 1, wherein the at least one airborne obstruction comprises at least one of a wire or a clothesline.

3. The method of claim 1, wherein the at least one imaging device comprises a first imaging device and a second imaging device,
    wherein the first imaging device and the second imaging device are separated by a baseline distance,
    wherein the first image is captured by the first imaging device,
    wherein the second image is captured by the second imaging device, and
    wherein generating the reconstruction of the landing area comprises:
        calculating, for each of the plurality of points, a distance between one of the pixels corresponding to the plurality of points depicted in the first image to one of the pixels corresponding to the plurality of points depicted in the second image,
    wherein the disparities are determined based at least in part on the distances calculated for each of the plurality of points.

4. The method of claim 1, wherein determining the disparities comprises:
    providing each of the first image and the second image to an optical flow algorithm as inputs; and
    receiving an output from the optical flow algorithm, wherein the output comprises a vector field comprising a plurality of vectors, and
    wherein each of the vectors represents a disparity between one of the pixels corresponding to the plurality of points depicted in the first image and one of the pixels corresponding to the plurality of points depicted in the second image.

5. The method of claim 1, wherein determining the disparities comprises:
    matching each of the pixels corresponding to the plurality of points depicted in the first image to one of the pixels corresponding to the plurality of points depicted in the second image; and
    determining, for each of the pixels corresponding to the plurality of points depicted in the first image, a distance to the matched one of the pixels corresponding to the plurality of points depicted in the second image,
    wherein each of the distances calculated for each of the plurality of points is one of the disparities.

6. A method comprising:
    capturing a first image by at least one imaging device provided aboard an aerial vehicle, wherein a field of view of the at least one imaging device includes at least one surface at a first location;
    capturing a second image by the at least one imaging device;

defining a first operating area for performance of an evolution by the aerial vehicle with respect to the at least one surface based at least in part on at least one of the first image or the second image;

determining a first plurality of pixel disparities between a first plurality of pixels of the first image and a second plurality of pixels of the second image, wherein at least some of the first plurality of pixels of the first image correspond to points of the first operating area depicted within the first image, and wherein at least some of the second plurality of pixels correspond to the points of the first operating area depicted within the second image;

determining whether the first operating area includes at least one obstruction based at least in part on the first plurality of pixel disparities; and in response to determining that the first operating area includes the at least one obstruction,
suspending the evolution of the aerial vehicle.

7. The method of claim 6, further comprising:
in response to determining that the first operating area does not include the at least one obstruction,
performing the evolution of the aerial vehicle at the first operating area.

8. The method of claim 6, wherein determining the first plurality of pixel disparities comprises:
providing each of the first image and the second image to an optical flow algorithm as inputs; and
receiving an output from the optical flow algorithm, wherein the output comprises a vector field comprising a plurality of vectors, and
wherein each of the plurality of vectors represents one of the pixel disparities.

9. The method of claim 6, wherein determining the first plurality of pixel disparities comprises:
matching each of the first plurality of pixels of the first image to one of the second plurality of pixels of the second image; and
determining, for each of the first plurality of pixels, a distance to the matched one of the second plurality of pixels of the second image,
wherein each of the distances corresponds to one of the pixel disparities.

10. The method of claim 6, wherein the at least one imaging device comprises a first imaging device and a second imaging device,
wherein the first imaging device and the second imaging device are separated by a baseline distance,
wherein the first image is captured by the first imaging device,
wherein the second image is captured by the second imaging device, and
wherein determining whether the first operating area includes at least one obstruction based at least in part on the first plurality of pixel disparities comprises:
calculating distances to each of the points of the first operating area based at least in part on the first plurality of pixel disparities; and
generating a first three-dimensional reconstruction of the first operating area based at least in part on the distances,
wherein whether the first operating area includes the at least one obstruction is determined based at least in part on the first three-dimensional reconstruction of the first operating area.

11. The method of claim 10, further comprising:
performing a difference of Gaussian filter on the first three-dimensional reconstruction,
wherein determining whether the first operating area includes the at least one obstruction comprises:
determining whether the first operating area includes at least one obstruction based at least in part on at least the filtered first three-dimensional reconstruction.

12. The method of claim 6, wherein the at least one imaging device comprises a first imaging device,
wherein the first image is captured by the first imaging device at a first time,
wherein the second image is captured by the first imaging device at a second time.

13. The method of claim 6, wherein the first image is captured at a first time and the second image is captured at approximately the first time, and
wherein the method further comprises:
in response to determining that the first operating area includes the at least one obstruction,
capturing a third image by the at least one imaging device during the performance of the evolution by the aerial vehicle, wherein the third image is captured at a second time;
capturing a fourth image by the at least one imaging device during the performance of the evolution by the aerial vehicle, wherein the fourth image is captured at approximately the second time;
defining a second operating area for the performance of the evolution with respect to the at least one surface based at least in part on at least one of the third image or the fourth image;
determining a second plurality of pixel disparities between a third plurality of pixels of the third image and a fourth plurality of pixels of the fourth image, wherein at least some of the third plurality of pixels of the third image correspond to points of the second operating area depicted within the third image, and wherein at least some of the fourth plurality of pixels corresponds to the points of the second operating area depicted within the fourth image;
determining whether the second operating area includes at least one obstruction based at least in part on at least the second plurality of pixel disparities; and
in response to determining that the second operating area does not include the at least one obstruction,
performing the evolution of the aerial vehicle in the second operating area.

14. The method of claim 6, wherein defining the first operating area for the performance of the evolution by the aerial vehicle with respect to the at least one surface comprises:
detecting at least one fiducial marker on the at least one surface within the at least one of the first image or the second image;
recognizing at least one attribute of the at least one fiducial marker; and
selecting at least one point associated with the at least one fiducial marker based at least in part on the at least one attribute,
wherein the first operating area is a circle having a predetermined radius from the at least one point.

15. The method of claim 6, wherein determining whether the first operating area includes the at least one obstruction based at least in part on the first plurality of pixel disparities comprises:

determining, for each of the first plurality of pixels of the first image, a difference between an intensity value of one of the first plurality of pixels of the first image and an intensity value of a corresponding one of the second plurality of pixels of the second image;

generating a difference image based at least in part on the differences between the intensity values;

calculating a score for the difference image, wherein the score comprises at least one of a peak difference, a mean difference or a median difference in the intensity values between the one of the first plurality of pixels of the first image and the corresponding one of the second plurality of pixels of the second image; and determining that the score exceeds a predetermined threshold, wherein the evolution of the aerial vehicle is suspended in response to determining that the score exceeds the predetermined threshold.

16. The method of claim 6, wherein the at least one obstruction comprises at least one wire or at least one clothesline, and wherein the at least one wire or the at least one clothesline is suspended over or within a vicinity of at least a portion of the first operating area.

17. The method of claim 6, further comprising:

receiving, by at least one transceiver associated with the aerial vehicle, information regarding a destination for the performance of the evolution by the aerial vehicle, wherein the information regarding the destination comprises an identifier of at least one point at the destination, and wherein the evolution comprises at least one of a landing, a delivery of at least a first item or a retrieval of at least a second item; and determining, by at least one sensor associated with the aerial vehicle, that the aerial vehicle is within a vicinity of the at least one point, wherein the first image and the second image are captured in response to determining that the aerial vehicle is within the vicinity of the at least one point.

18. A method comprising:

capturing a first image by a first imaging device aboard an unmanned aerial vehicle at a first time;

capturing a second image by a second imaging device aboard the unmanned aerial vehicle at approximately the first time;

determining a first plurality of pixel disparities between the first image and the second image according to at least one of:
  an optical flow algorithm; or
  a stereo matching algorithm;

identifying at least a first ground location that does not include at least one ground obstruction based at least in part on at least some of the first plurality of pixel disparities; and causing a descent of the unmanned aerial vehicle toward the first ground location;

capturing a third image by the first imaging device at a second time, wherein the second time follows the first time;

capturing a fourth image by the second imaging device at approximately the second time;

determining a second plurality of pixel disparities between the third image and the fourth image according to at least one of:
  the optical flow algorithm; or
  the stereo matching algorithm;

identifying at least one airborne obstruction based at least in part on at least some of the second plurality of pixel disparities; and in response to identifying the at least one airborne obstruction,
  halting the descent of the unmanned aerial vehicle.

19. The method of claim 18, wherein identifying at least the first ground location comprises:

generating a first three-dimensional reconstruction based at least in part on the at least some of the first plurality of pixel disparities, wherein at least the first ground location is identified based at least in part on the first three-dimensional reconstruction, and wherein identifying the at least one airborne obstruction comprises:

generating a second three-dimensional reconstruction based at least in part on the at least some of the second plurality of pixel disparities, wherein the at least one airborne obstruction is identified based at least in part on the second three-dimensional reconstruction.

20. The method of claim 18, wherein identifying at least the first ground location comprises:

generating a first difference image based at least in part on the at least some of the first plurality of pixel disparities, wherein at least the first ground location is identified based at least in part on the first difference image, and wherein identifying the at least one airborne obstruction comprises:

generating a second difference image based at least in part on the at least some of the second plurality of pixel disparities, wherein the at least one airborne obstruction is identified within the second difference image.

21. The method of claim 18, further comprising:

causing a lateral variation in position of the unmanned aerial vehicle, wherein each of the first image and the second image is captured prior to causing the lateral variation, and wherein each of the third image and the fourth image is captured following the lateral variation.

22. The method of claim 18, further comprising:

capturing a fifth image by the first imaging device at a third time, wherein the third time follows the second time;

capturing a sixth image by the second imaging device at approximately the third time;

determining a third plurality of pixel disparities between the fifth image and the sixth image according to at least one of:
  the optical flow algorithm; or
  the stereo matching algorithm;

identifying at least a second ground location based at least in part on at least some of the third plurality of pixel disparities, wherein an area between the unmanned aerial vehicle and the second ground location does not include the at least one airborne obstruction; and causing a descent of the unmanned aerial vehicle toward the second ground location.

23. The method of claim 18, wherein the at least one airborne obstruction comprises at least one of a wire or a clothesline.

* * * * *